US012271690B2

(12) United States Patent
Mahindru et al.

(10) Patent No.: US 12,271,690 B2
(45) Date of Patent: Apr. 8, 2025

(54) VIRTUAL DIALOG SYSTEM DYNAMIC CONTEXT COLLECTION

(71) Applicant: International Business Machines Corporation, Armonk, NY (US)

(72) Inventors: Ruchi Mahindru, Elmsford, NY (US); Xin Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 17/728,450

(22) Filed: Apr. 25, 2022

(65) Prior Publication Data

US 2023/0342545 A1 Oct. 26, 2023

(51) Int. Cl.
*G06F 40/211* (2020.01)
*G06F 16/3329* (2025.01)
*G06N 5/02* (2023.01)

(52) U.S. Cl.
CPC ........ *G06F 40/211* (2020.01); *G06F 16/3329* (2019.01); *G06N 5/02* (2013.01)

(58) Field of Classification Search
CPC .... G06F 40/211; G06F 16/3329; G06F 40/35; G06F 40/289; G06F 40/30; G06N 5/02; G06N 5/022; G06N 3/09; G06N 20/00; G06N 3/04; G06N 3/08
See application file for complete search history.

(56) References Cited

U.S. PATENT DOCUMENTS

| | | | |
|---|---|---|---|
| 10,380,520 B2 | 8/2019 | Srivastava | |
| 10,418,032 B1* | 9/2019 | Mohajer | ............ G10L 15/1815 |
| 10,944,800 B1* | 3/2021 | Arsanjani | ............... H04L 67/60 |
| 11,929,963 B1* | 3/2024 | Zheng | .......................  G06F 8/77 |
| 2004/0148170 A1* | 7/2004 | Acero | ................... G06F 40/216 |
| | | | 704/257 |
| 2007/0156510 A1* | 7/2007 | Kim | ....................... G06Q 10/04 |
| | | | 705/7.31 |
| 2013/0326048 A1* | 12/2013 | Heidasch | ................. G06N 5/02 |
| | | | 709/224 |
| 2017/0109655 A1* | 4/2017 | Miyazaki | ............... G06N 5/022 |
| 2018/0150555 A1 | 5/2018 | Karuppasamy | |
| 2018/0260856 A1* | 9/2018 | Balasubramanian | ....................... |
| | | | G06F 40/211 |
| 2019/0156821 A1* | 5/2019 | Zamora Duran | ..... G06F 40/242 |
| 2019/0304445 A1* | 10/2019 | Nahamoo | ............... G10L 15/22 |
| 2020/0125900 A1* | 4/2020 | Posner | ................ G06F 18/2433 |

(Continued)

OTHER PUBLICATIONS

Gupta, Manish, et al., "Context-Aware Time Series Anomaly Detection for Complex Systems", Proceeding of the SDM Workshop on Data Mining for Service and Maintenance, Jan. 2013.

(Continued)

*Primary Examiner* — Bhavesh M Mehta
*Assistant Examiner* — Philip H Lam
(74) *Attorney, Agent, or Firm* — James L. Olsen

(57) ABSTRACT

A system, computer program product, and a computer implemented method are provided for interfacing with a virtual dialog environment to dynamically and optimally collected context for problem diagnosis and resolution. A context model is leveraged to identify context entities, and one or more corresponding context collection mechanisms. The context model is implemented in real-time to facilitate dynamic selection of one or more of the identified context collection mechanisms, which are selectively subject to execution to resolve the problem diagnosis.

12 Claims, 14 Drawing Sheets

(56) References Cited

U.S. PATENT DOCUMENTS

2020/0380202 A1\* 12/2020 Cass ..................... G06F 40/174
2022/0004479 A1\* 1/2022 McCawley ............. G06F 9/542

OTHER PUBLICATIONS

Kiseleva, Julia, et al., "Context Mining and Integration Into Predictive Web Analytics", World Wide Web Conference 2013 Companion: Proceedings of the 22nd International Conference on World Wide Web, May 2013, pp. 383-388.

Tahir, Hassane, "A Context-based approach for troubleshooting database problems" IJCSI International Journal of Computer Science Issues, vol. 11, Issue 6, No. 1, Nov. 2014.

Zoppi, Tommaso, et al., "Context-Awareness to improve Anomaly Detection in Dynamic Service Oriented Architectures", Computer Safety, Reliability and Security (SAFECOMP 2016), 2016, pp. 145-158.

\* cited by examiner

VIRTUAL DIALOG SYSTEM DYNAMIC CONTEXT COLLECTION

BACKGROUND

One or more of the present embodiments relate to a virtual dialog system employing an automated virtual dialog agent, such as, for example, a "chatbot," and a related computer program product and a computer-implemented method. In certain exemplary embodiments, corresponding automated virtual dialog agent interactions are evaluated to identify content and content collection mechanism(s) directed at data collection and resolution, with the resolution directed at machine learning (ML) and associated ML techniques.

An automated virtual dialog agent uses Artificial Intelligence (AI) as a platform to conduct a natural language (NL) interaction between the automated virtual dialog agent and, typically, a user such as a consumer or client or even another dialog agent. The interaction may involve product sales, customer service, information acquisition, or other types of interactions or transactions. Chatbots interact with the user through dialog, often either textual (e.g., online or by text) or auditory (e.g., by telephone). It is known in the art for the chatbot to function as a question-answer component between a user and the AI platform. The quality of the questions (or queries) and answers (or responses) are derived from the quality of question understanding, question transformation, and answer resolution. A frequent cause of not attaining a quality standard is commonly found is either inappropriate or inefficient question generation to solicit a corresponding response. This may be due to a lack of knowledge for an effective transformation of the question into an equivalent knowledge representation that maps to the answer, or it may be due to an inefficiency within the AI platform or the chatbot. For example, a lack of synonyms or concept relations can limit the ability of the AI platform to determine that a question input by the customer or client is equivalent or related to a known question for which an answer is available within a dataset or database.

Chatbots are commonly used to resolve issues, including problem diagnosis. For example, in the information technology (IT) venue, the chatbot may be employed to diagnose a technical problem with the equipment. Context, which is defined as words that are used with a certain word or phrase and that helps to explain its meaning, is important in diagnosing a problem, whether technical or other. Incorrect context collection may derail the problem diagnosis to an incorrect resolution. Similarly, incomplete context collection increases the time and effort associated with problem diagnosis. And, inefficient context collection causes unnecessary conversation with users, and damages or negatively affects the user experience. Accordingly, it is desirable to subject the virtual dialog system to efficient and accurate context collection directed at accurate and effective context resolution.

SUMMARY

The embodiments include a system, a computer program product, and a method for improving the performance of a dialog system. This Summary is provided to introduce a selection of representative concepts in a simplified form that is further described below in the Detailed Description. This Summary is not intended to identify key features or essential features of the claimed subject matter, nor is it intended to be used in any way that would limit the scope of the claimed subject matter.

In one aspect, a computer system is provided having a processor operatively coupled to a memory, and an artificial intelligence (AI) platform operatively coupled to the processor. The AI platform includes one or more tools to interface with a virtual dialog agent, and in an embodiment to resolve a problem diagnosis. The tools embedded in the AI platform include a collection manager, a director, a selection manager, and an execution manager. The collection manager is configured to dynamically collect context data from a virtual dialog environment for problem diagnosis. In an exemplary embodiment, the collection manager employs natural language processing (NLP) to identify one or more context entities from the virtual dialog agent. The director is configured to leverage a context model to identify a set of context entities to be collected and one or more corresponding context collection mechanisms. The selection manager is configured to dynamically select one or more of the identified context collection mechanisms responsive to the leveraged context model. Application of the one or more identified collection mechanisms is facilitated via the execution manager, which is configured to selectively execute one or more of the selected and identified context collection mechanisms.

In another aspect, a computer program product is provided with a computer readable storage medium or media, and program code stored on the computer readable storage medium or media. The program code is executable by a computer processor to improve the performance of a virtual dialog agent. Program code is provided to dynamically collect context data from a virtual dialog environment for problem diagnosis. In an exemplary embodiment, the problem diagnosis employs natural language processing (NLP) to identify one or more context entities from the virtual dialog agent. Program code is further provided and configured to leverage a context model to identify a set of context entities to be collected and one or more corresponding context collection mechanisms. Program code is further provided and configured to dynamically select one or more of the identified context collection mechanisms responsive to the leveraged context model. Application of the one or more identified collection mechanisms is facilitated via program code configured to selectively execute one or more of the selected and identified context collection mechanisms.

In yet another aspect, a computer-implemented method is provided for improving the performance of a virtual dialog agent. The method is configured to dynamically collect context data from a virtual dialog environment for problem diagnosis. In an exemplary embodiment, the problem diagnosis employs natural language processing (NLP) to identify one or more context entities from the virtual dialog agent. A context model is leveraged to identify a set of context entities to be collected and one or more corresponding context collection mechanisms. One or more of the identified context collection mechanisms is dynamically selected in response to the leveraged context model. Application of the one or more identified collection mechanisms is facilitated via selective execution of one or more of the selected and identified context collection mechanisms.

These and other features and advantages will become apparent from the following detailed description of the present exemplary embodiment(s), taken in conjunction with the accompanying drawings.

BRIEF DESCRIPTION OF THE SEVERAL VIEWS OF THE DRAWINGS

The drawings referenced herein form a part of the specification and are incorporated herein by reference. Features shown in the drawings are meant as illustrative of only some embodiments, and not of all embodiments, unless otherwise explicitly indicated.

DETAILED DESCRIPTION

Figure 1:
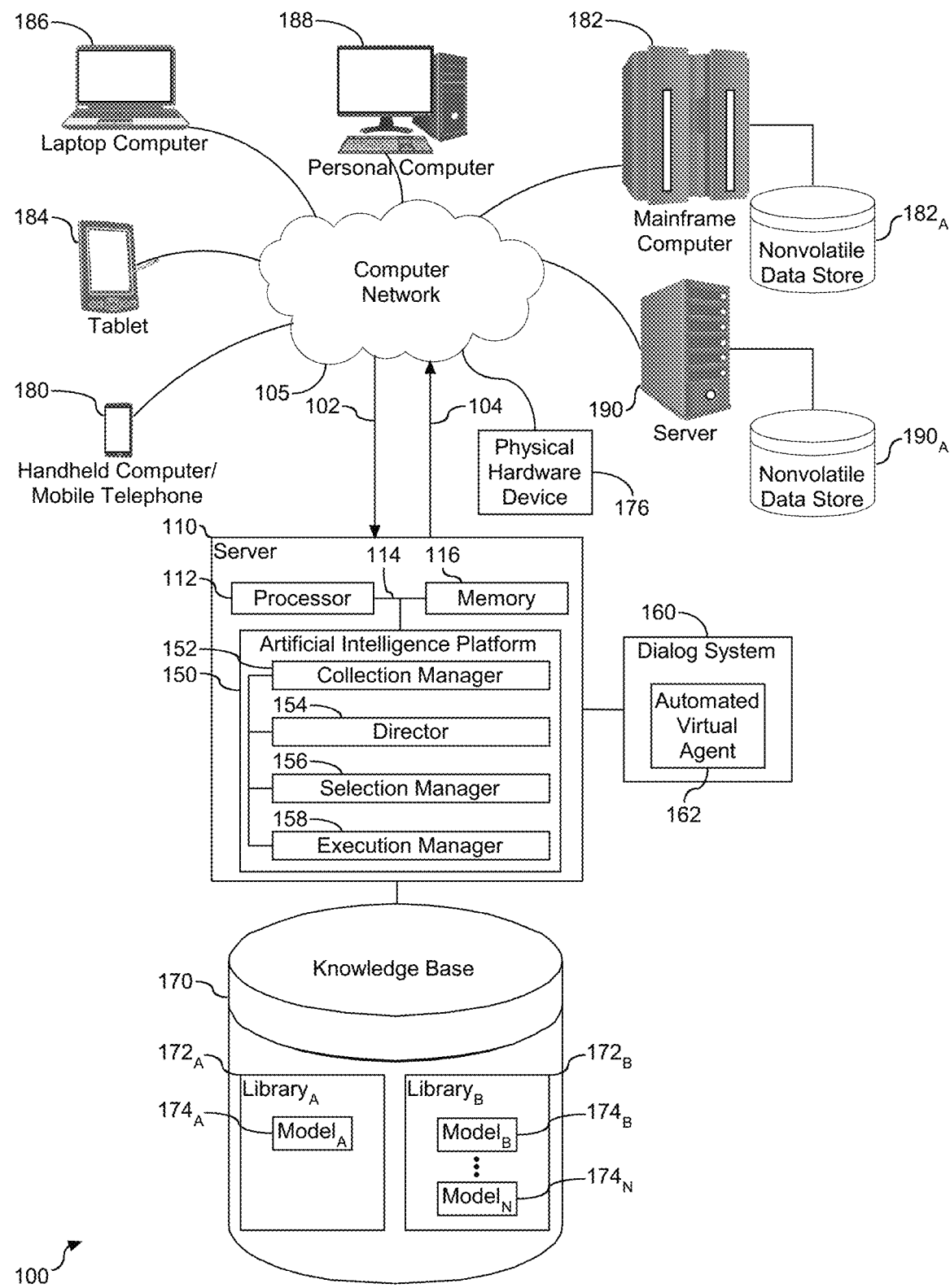
FIG. 1 depicts a system diagram illustrating an artificial intelligence platform computing system in a network environment.

It will be readily understood that the components of the present embodiments, as generally described and illustrated in the Figures herein, may be arranged and designed in a wide variety of different configurations. Thus, the following detailed description of the exemplary embodiments of the apparatus, system, method, and computer program product, as presented in the Figures, is not intended to limit the scope of the embodiments, as claimed, but is merely representative of selected embodiments.

Reference throughout this specification to "a select embodiment," "one embodiment," "an exemplary embodiment," or "an embodiment" means that a particular feature, structure, or characteristic described in connection with the embodiment is included in at least one embodiment. Thus, appearances of the phrases "a select embodiment," "in one embodiment," "in an exemplary embodiment," or "in an embodiment" in various places throughout this specification are not necessarily referring to the same embodiment. The embodiments described herein may be combined with one another and modified to include features of one another. Furthermore, the described features, structures, or characteristics of the various embodiments may be combined and modified in any suitable manner.

The illustrated embodiments will be best understood by reference to the drawings, wherein like parts are designated by like numerals throughout. The following description is intended only by way of example, and simply illustrates certain selected embodiments of devices, systems, products, and processes that are consistent with the embodiments as claimed herein.

In the field of artificially intelligent computer systems, natural language systems (such as the IBM Watson® artificially intelligent computer system and/or other natural language systems) process natural language based on knowledge acquired by the system. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

An automated virtual agent, referred to herein as a chatbot, is an Artificial Intelligence (AI) program that simulates interactive human conversation by using pre-calculated phrases and auditory or text-based signals. Chatbots are increasingly used in an electronic platform for customer service support. In an embodiment, the chatbot may function as an intelligent virtual agent. Each chatbot experience is comprised of a set of communications comprised of user actions and dialog system actions, with the experience having a discriminative behavior pattern.

It is known in the art that the chatbot frequently receives questions or statements with respect to a problem or a problem description, with a static approach for resolution of the problems directed at matching the presented problems with a known problem in a knowledge base. However, problems and corresponding solutions or remediation actions may be progressive in nature and subject to evolution. As shown and described herein, the chatbot platform is combined with ML to leverage problem identification, diagnosis, and resolution in a dynamic manner to overcome the limitations associated with the static approach. In an exemplary embodiment, AI and ML technologies are integrated to interface with a physical hardware device, software, or a combination of the hardware and software. Details of the AI and ML integration are described in detail below.

Referring to FIG. 1, a schematic diagram of an artificial intelligence (AI) platform and corresponding computer system (100) is depicted. As shown, a server (110) is provided in communication with a plurality of computing devices (180), (182), (184), (186), (188), and (190) across a network connection, e.g. computer network, (105). The server (110) is configured with a processing unit, e.g., a processor, in communication with memory across a bus. The server (110) is shown with an AI platform (150) operatively coupled to a dialog system (160), a corresponding virtual dialog agent (162), e.g. chatbot, and a context model, e.g. data source. A knowledge graph is known in the art as a semantic network of entities with components in the form of nodes, edges, and labels. The context model, although similar to the knowledge graph at the meta level, the context model contains the definition of entities, e.g. context, name, description, type, and the relationship between different entities, and at the instance level, the context model contains actual values of the entities. In an embodiment, the context model may be stored in a knowledge base (170). Similarly, in an embodiment, there may be multiple context models stored in the knowledge base (170). The computing devices (180), (182), (184), (186), (188), and (190) may be provided with a visual display, audio interface, an audio-video interface, or other types of interfaces configured to allow the user to interface with a representation of a virtual agent, e.g., chatbot, (162).

The AI platform (150) is operatively coupled to the network (105) to support interaction with the virtual dialog agent (162) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The AI platform (150) is also shown herein operatively coupled to the knowledge base (170), also referred to herein as a corpus of information. As shown, the knowledge base (170) is configured to store one or more context models. In the example shown herein, the knowledge base (170) is shown with a plurality of libraries, shown herein by way of example as Library$_A$ (172$_A$) and Library$_B$ (172$_B$), each configured to store or receive one or more context models. While two libraries are shown in FIG. 1, it should be understood that the knowledge base (170) may include fewer or more libraries. Further, the libraries, e.g. Library$_A$ (172$_A$) and Library$_B$ (172$_B$) may be combined together. The libraries, Library$_A$ (172$_A$) and Library$_B$ (172$_B$) may exist across a plurality of knowledge domains. Each library is populated with one or more context models. As shown herein by way of example, there may be multiple context models represented as model$_A$ (174$_A$), model$_B$ (174$_B$), . . . , model$_N$ (174$_N$), with model$_A$ (174$_A$) shown stored in library$_A$ (172$_A$), and model$_B$ (174$_B$) . . . model$_N$ (174$_N$) shown stored in library$_B$ (172$_B$). The quantity of libraries and models shown here is for exemplary purposes and should not be considered limiting.

The AI platform (150) is shown herein with a plurality of tools to support context resolution directed at improving the performance of the dialog system (160) and the corresponding automated virtual dialog agent, e.g., chatbot, (162) experience. The tools to support the context resolution include a collection manager (152), a director (154), a selection manager (156), and an execution manager (158). Details of the tools and their corresponding functions are shown and described in detail below.

It is understood in the art that a chatbot is a computer program that uses AI and natural language processing (NLP) to understand customer questions and automate responses, thereby simulating human conversation. As shown and described herein, the tools (152)-(158) enhance the virtual dialog agent (162), and the associated experience to efficiently and effectively reach a resolution of the question(s) presented. The collection manager (152) is configured to interface with the dialog system (160) to dynamically collect context data for problem diagnosis. In an exemplary embodiment, the problem diagnosis may be directed at information technology (IT) problems, although this category should not be considered limiting. The dialog system (160), and more specifically the virtual dialog agent (162) supports natural language communication with a user. The collection manager (152) employs natural language processing (NLP) to identify one or more context entities from the virtual agent (162). As shown and described in FIG. 3, input data, which is an exemplary embodiment is in the form of a problem description is presented to the virtual dialog agent (162). Dialog between the agent (162) and a user is dynamic in nature. The collection manager (152) operates in a dynamic manner, i.e., in real-time, to collect context data from the dialog.

The input received by the agent (162) from the user is used to dynamically determine a collection sequence, e.g., what to collect and the order in which it should be collected. As shown herein, the director (154) functions to leverage a context model to identify a set of context entities to be collected and one or more context collection mechanisms. In an embodiment, the director (154) selects a context model from the knowledge base (170), with the selection based on an initial topic associated with the user input. In an exemplary embodiment, the director (154) may change the context model selection to an alternative context model. As shown and described below in FIG. 4, historical tickets containing a set of reported problems and resolutions are utilized in building the context model. Triples are created from the historical tickets, with each triple including a problem, context, and resolution. The context model is built based on historical tickets of reported problems and corresponding resolution, frequently from a prior virtual agent interaction. Accordingly, the leveraging of the context model by the director (154) identifies a set of entities to be collected and one or more collection mechanisms based on historical context and corresponding resolution.

It is understood that the problem presented or otherwise submitted by the user may require different forms of data collection, e.g., collection mechanisms, and order for invoking the collection mechanism. As shown and described in FIG. 6A, a process is provided to dynamically determine a sequence for collecting data associated with corresponding collection mechanisms. In addition to or as part of the collection sequencing, there is a machine learning component managed by the director (154). Deep learning is a method of machine learning that incorporates neurons in successive layers to learn from data in an iterative manner. Neural networks are models of the way the nervous system operates. Basic units are referred to as neurons, which are typically organized into layers. Within an artificial neural network (ANN), the neuron is a placeholder for a mathematical function. The neuron receives input, applies the mathematical function on the input, thereby generating output. Connections between neurons are characterized by weights, which represent the significance of the connection. The neural network works by simulating many interconnected processing units that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to some neurons in the next layer. At a basic level, each layer of the neural network includes one or more operators or functions operatively coupled to output and input. The outputs of evaluating the activation functions of each neuron with provided inputs are referred to herein as activations. Deep learning complex neural networks are designed to emulate how the human brain works, so computers can be trained to support poorly defined abstractions and problems where training data is available. Neural networks and deep learning are often used in image recognition, speech, and computer vision applications.

Machine learning uses a variety of algorithms that iteratively learn from data to improve, describe data, and predict outcomes. A training data set is a set of pairs of input patterns with corresponding desired output patterns. Each pair represents how the network is supposed to respond to a particular input. A machine learning (ML) model is the output generated when a corresponding machine learning algorithm is trained with the training set. After training is complete and the ML model is provided with input, the ML model generates output. In an exemplary embodiment, the ANN utilized by the director (154) is a regression ANN, e.g., an ANN employing a regression algorithm, to predict an output variable as a function of inputs or input features. With respect to collection mechanisms, the ANN in the form of the context model computes a confidence value of one or more collection mechanisms. The director (154) interfaces with the ANN to learn confidence and to apply the learned confidence for each collection mechanism. Details of the confidence learning with respect to reliability of different collection mechanisms are shown and described in FIGS. 8A and 8B. In an exemplary embodiment, the collection mechanisms may include an API, usage logs, etc., with the model computing a confidence value for each mechanism with respect to the data to be collected. In an embodiment, there may be different mechanisms available to collect the same data. The selection manager (156), which is operatively coupled to the director (154), functions to dynamically select at least one of the context collection mechanisms identified by the director (154) and responsive to the output from the context model. In an exemplary embodiment, the director (154) dynamically determines a collection sequence, which includes calculation of entropy of each context type, and selection of a context type based on the calculated entropy. In an embodiment, the context type with the highest score is identified by the director (154) and selected by the selection manager (156), and in an embodiment, the selection manager (156) leverages the learned confidence values and the calculated entropy to determine a sequence for using the associated collection mechanisms. Details of the collection sequence determination, including entropy calculation and context type selection are shown and described in FIGS. 6A and 6B.

The execution manager (158) is configured to selectively execute one or more of the identified collection mechanisms to collect context, which in an embodiment are executed based on the collection sequence as determined by the selection manager (156). The confidence level of the collection mechanisms is learned over time and in an embodiment, the learned confidence level may be used to adjust the order or sequence of the collection mechanisms. It is understood in that art that collection mechanisms attain characteristics over time, or in an embodiment have performance characteristics. In an embodiment, the frequency of data updates in the collection mechanisms may vary. For example, a first collection mechanism may have data available more readily close to real-time but it may be re-calculated at a longer time frame, e.g. nightly, weekly, etc. with conflict resolution, and hence more consistent data. In an exemplary embodiment, such characteristics may affect the selection or identification of the collection mechanism(s) as well as an order in the collection sequence determination. In an aspect of the collection sequence determination, the selection manager (156) is configured to cross-validate collected context. Details of the cross-validation are shown and described in FIG. 9. In supporting the cross-validation, the selection manager (156) analyzes the consistency of context values obtained from different collection mechanisms. In an embodiment, two or more collection mechanisms may be utilized to collect the same data. Although the collected data should theoretically be consistent, the collected data may in fact be inconsistent. For example, a first collection mechanism may return a first value and a second collection mechanism, different from the first collection mechanism, may return a second value different from the returned first value. If the first and second context values are consistent, then the value and corresponding collection mechanism are finalized, and if the first and second context values are inconsistent, then they are subject to further analysis. In an exemplary embodiment, a human-in-the loop may be leveraged to resolve the inconsistent context values and corresponding collection mechanisms.

With respect to the application of the tools (152)-(158), the virtual dialog agent (162) leverages the tools to support dynamic user interaction to refine a match efficiently and effectively between a presented problem with known symptoms, also referred to herein as problems. The virtual dialog agent (162) provides a venue or interface that is subject to change. The director (154) is configured to support the dynamic nature of the virtual dialog agent (162), and in an exemplary embodiment, the director (154) dynamically optimizes one or more subsequent collection mechanisms in response to context returned from the first collection mechanism. The optimization (154) managed or implemented by the director (154) is directed at minimizing the presentation of questions to attain resolution. More specifically, the optimization is directed at reducing the dialog between the virtual dialog agent (162) and a user while identifying a resolution to the problem presented. Details of the optimization are shown and described in FIGS. 6A and 6B.

The dialog system (160) is an interactive AI interface configured to support communication between a virtual agent and a non-virtual agent, such as a user (e.g., end user), which can be human or software, and potentially an AI virtual agent. The interactions that transpire generate what is referred to as conversations or dialog interactions, with the content of such conversation or dialog interaction between a user and a virtual agent.

The AI platform (150) is shown herein operatively coupled to the dialog system (160) and its virtual dialog agent (162), which is configured to receive input (102) from various sources across the network (105). For example, the dialog system (160) may receive input across the network (105) and leverage one of more collection mechanisms to obtain context as output or response content. The created output or response content may be returned as output (104) across the computer network (105) to the same source and/or another source or sources.

The various computing devices (180), (182), (184), (186), (188), and (190) in communication with the network (105) may include access points to the AI platform (150), the dialog system (160) and corresponding agent (162), and the corresponding tools, including the collection manager (152), the director (154), the selection manager (156), and the execution manager (158). Some of the computing devices may include devices for use by the AI platform (150), and in an embodiment the tools (152), (154), (156), and (158) to support virtual dialog optimization. The network (105) may include local network connections and remote connections in various embodiments, such that the AI platform (150) may operate in environments of any size, including local and global, e.g., the Internet. Additionally, the AI platform (150) serves as a back-end system that can make available a variety of knowledge extracted from or represented in documents, network accessible sources and/or structured data sources. In this manner, some processes populate the AI platform (150), with the AI platform (150) also including input interfaces to receive requests and respond accordingly.

As shown, users may access the AI platform (150) and the operatively coupled dialog system (160) via a network connection or an Internet connection to the network (105), and may submit natural language (NL) input to the dialog system (160) from which the AI platform (150) may effectively determine an output response related to the input by leveraging the operatively coupled knowledge base (170) and the tools that comprise the AI platform (150).

The dialog events that are created or enabled by the dialog system (160) may be processed by the server (110), and the corresponding AI platform (150). In some illustrative embodiments, server (110) may be the IBM Watson® system available from International Business Machines Corporation of Armonk, New York, augmented with the mechanisms of the illustrative embodiments described hereafter. The selection manager (158) executes one or more of the identified context collection mechanisms. In an exemplary embodiment, a physical device (176) with the identified problem is operatively coupled to the server (110) across a network connection. The context generated by the collection mechanism(s) identifies a solution or correction to the presented problem. The execution manager (158) is configured to dynamically generate a control signal to the physical hardware device (176), a process controlled by software, or a combination of the physical hardware device and the software, associated with the generated context and identified solution. The physical hardware device (176) is shown herein operatively coupled to the server (110) across the network (105). In an embodiment, the device (176) may be operatively coupled to the server (110) or one or more of the systems (180), (182), (184), (186), (188), and (190). In an exemplary embodiment, the control signal selectively controls the operatively coupled physical hardware device (176), or in an embodiment a process controlled by software or a combination of the physical hardware device and the software, with the control signal selectively modifying a physical functional aspect of the device (176). In an embodiment, the device (176) may be a first physical device operatively coupled to an internal component, or in an embodiment a second physical device, and the issued first signal may modify an operating state of the internal component or the second device. For example, the first device (176) may be a product dispenser, and the control signal may modify or control a product dispensing rate to accommodate the rate at which the second device receives the dispensed product. In an embodiment, the execution manager (158) computes a control action based on the generated context, and constructs or configures the control signal that aligns or is commensurate with the computed control action. In an exemplary embodiment, the control action may be applied as a feedback signal to directly control an event injection to maximize the likelihood of realizing an event or operating state of the device (176).

Types of information handling systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190A), and mainframe computer (182) utilizes nonvolatile data store (182A). The nonvolatile data store (182A) can be a component that is external to the various information handling systems or can be internal to one of the information handling systems.

The information handling system employed to support the AI platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
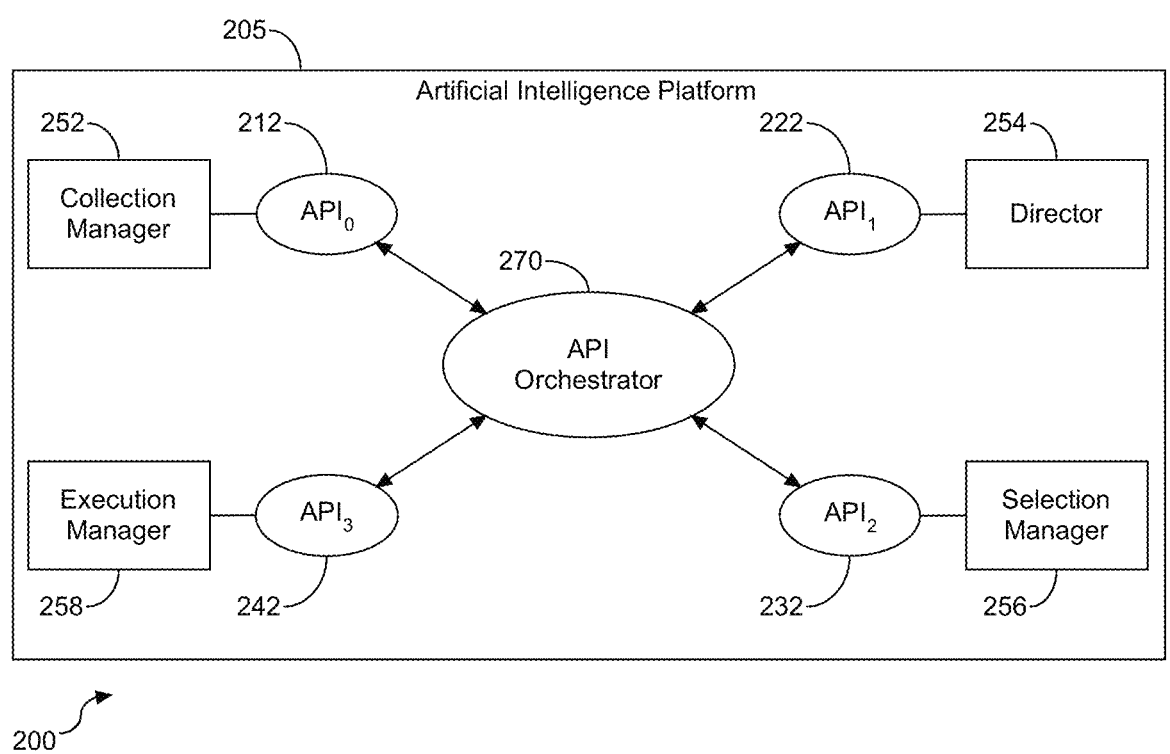
FIG. 2 depicts a block diagram illustrating the artificial intelligence platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the AI platform tools, including the collection manager (152), the director (154), the selection manager (156), and the execution manager (158), and their associated functionality. Referring to FIG. 2, a block diagram (200) is provided illustrating the AI platform and its associated APIs. As shown, a plurality of tools are embedded within the AI platform (205), with the tools including the collection manager (252) associated with $API_0$ (212), the director (254) associated with AK (222), the selection manager (256) associated with $API_2$ (232), and the execution manager (258) associated with $API_3$ (242). Each of the APIs may be implemented in one or more languages and interface specifications.

$API_0$ (212) provides support for interfacing with a virtual dialog environment to dynamically collect content in support of a problem diagnosis. In an exemplary embodiment, $API_0$ (212) employs NLP for context entity identification. $API_1$ (222) provides functional support to leverage a context model for the identification of a set of context entities to be collected and one or more context collection mechanisms. In an exemplary embodiment, $API_1$ (222) determines or otherwise identifies a collection sequence of the context collection mechanisms. $API_2$ (232) provides functional support to dynamically select one or more of the context collection mechanisms. In an exemplary embodiment, $API_2$ (232) leverages a regression model for learning a confidence value for each of the identified collection mechanisms and employs the learned confidence value(s) to determine a collection sequence. $API_3$ (242) provides functional support to selectively execute one or more of the identified context collection mechanisms. As shown, each of the APIs (212), (222), (232), and (242) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
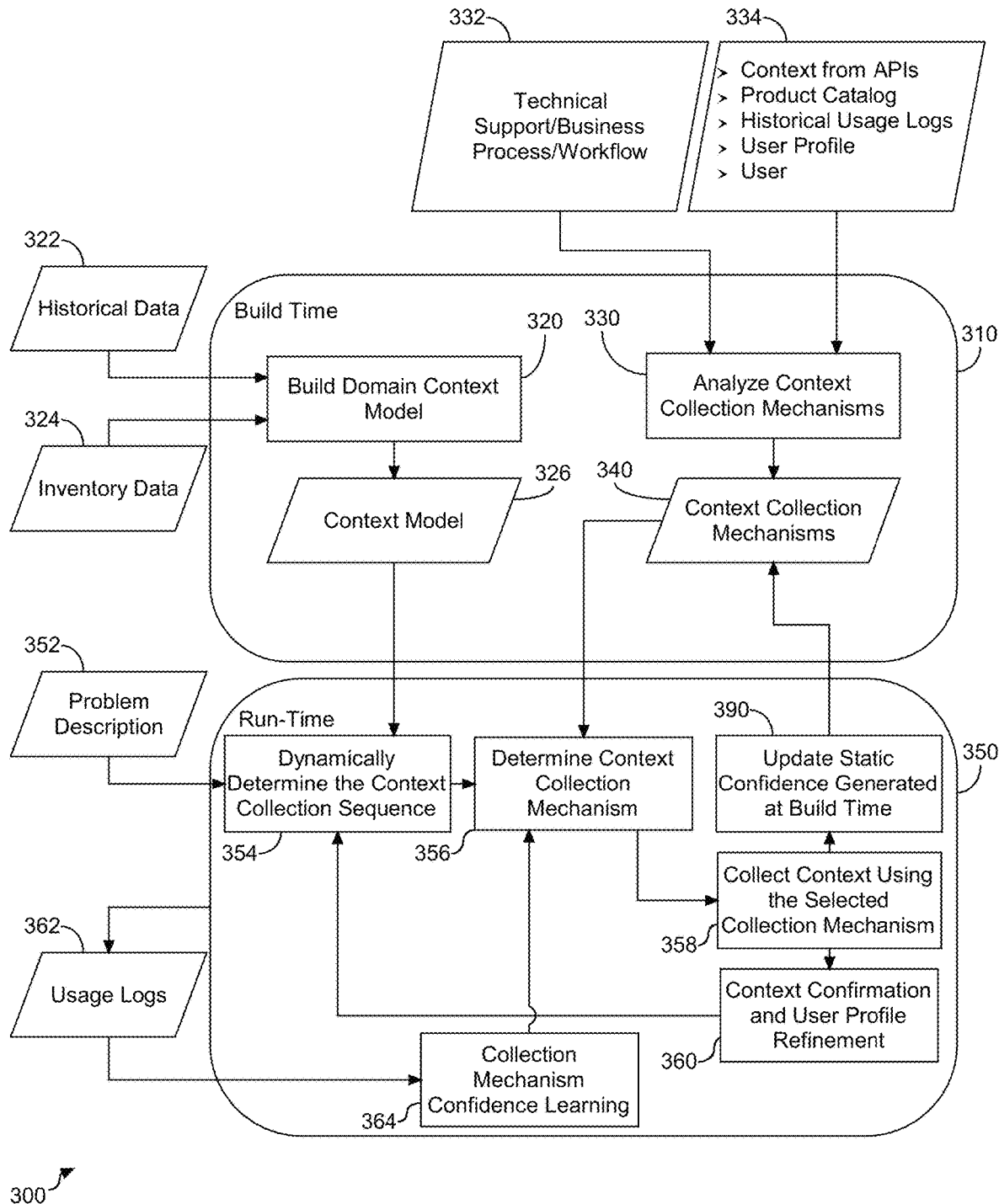
FIG. 3 depicts a flowchart illustrating an embodiment of a method of interfacing with a virtual dialog environment and dynamically and optimally collecting context for effective problem diagnosis and resolution.

Referring to FIG. 3, a flow diagram (300) illustrating a process for interfacing with a virtual dialog environment and dynamically and optimally collecting context for effective problem diagnosis and resolution. As shown and described, there are two primary components directed at the content collection and resolution, including a build component (310) and a run-time component (350). The build component (310) includes aspects of building a domain context model (320) and analyzing content collection mechanisms (330). In an exemplary embodiment, a domain is a sphere of activity or knowledge, and a domain content model is a context model representative of a specific domain. In an embodiment, a first domain may have a first domain context model, and a second domain different from the first domain may have a second domain content model different from the first domain context model. Input data utilized for building the domain context model includes historical data (322) and inventory data (324). Using the input (322) and (324), a domain context model (326) is built. Details of the method and associated steps of building the domain context model are shown and described in FIG. 4.

In addition to building the domain context model, the build component (310) supports analyzing content collection mechanisms (330). As shown, the collection mechanism analysis (330) utilizes input data in the form of technical support and business process workflow (332) and context from one or more services (334). In an exemplary embodiment, the one or more services (334) include, but are not limited to, context from application program interfaces (APIs), product catalogs, historical usage log data, profile data, and user data. Details of analyzing context collection mechanisms (330) is shown and described in FIG. 5. The content collection mechanism analysis (330) generates output in the form of identification of context collection mechanisms (340). Accordingly, the context model (326) and the identification of context collection mechanisms are aspects of the build component (310) that are employed in the run-time component (350).

As shown, the run-time component (350) interfaces with the virtual dialog agent shown herein as the receipt of input data in the form of a problem, or in an embodiment a symptom, description (352). It is understood in the art that a symptom is a feature which may be regarded as an indication of a condition of a problem. Using the input data (352), the run-time component (350) dynamically determines the content to be collected and a sequence for collecting the content (354). As shown, the content collection determination leverages the domain context model (326). In an exemplary embodiment, NLP is utilized to evaluate the problem description and identify a corresponding domain context model. Details of the dynamic determination of the content collection sequence is shown and described in FIGS. 6A and 6B. Following the collection sequence determination at step (354), the content collection mechanisms are identified or otherwise determined (356). As shown, the content collection mechanism(s) are identified in the form of output from step (340) and leveraged at step (356). Details of the determination of the content collection mechanisms are shown and described in FIG. 7. Following step (356), context is collected using the identified or determined context collection mechanism (s) (358), which is followed by confirmation of the collected context (360). Details of the problem refinement are shown and described in FIG. 9. It is understood in the art that the problem description presentation (352) and the collected content may not be consistent. In an embodiment, multiple content collection mechanisms are employed to collect what should be the same context. For example, a first collection mechanism may be employed to collect a first content, a second collection mechanism may be employed to collect the first content, etc. Using this example, the confirmation of the first content at (360) is an evaluation of the first content collected by each of the first and second collection mechanisms to evaluate consistency of the collected first content. In an exemplary embodiment, a Human-in-the-Loop may be utilized to refine the context.

As shown, in the event of problem refinement, the process returns to step (354) for context collection sequencing. Similarly, in the event of problem resolution, the context generated by the collection mechanism(s) identifies a solution or correction to the presented problem. In an exemplary embodiment, a control signal is dynamically configured to exemplify the solution or correction, with the control signal generated to interface with a physical hardware device, a process controlled by software, or a combination of the physical hardware device and the software, associated with the generated context and identified solution. In an exemplary embodiment, the control signal selectively controls the operatively coupled physical hardware device, or in an embodiment a process controlled by software or a combination of the physical hardware device and the software, with the control signal selectively modifying a physical functional aspect of the device. The identified solution or correction, and in an embodiment any refinements that took place to reach the identified solution or correction, are memorialized in corresponding usage logs (362).

Different collection mechanisms may return different results, e.g., different content, with the different results having corresponding quality characteristics. For example, a first collection mechanism in the form of a first API may return the first content and a second collection mechanism may return second content, with the first and second APIs being different collection mechanisms, and the first and second content being different content. As shown herein, the value of the collection mechanisms, e.g., the confidence of the collection mechanisms, is subject to learning (364). As shown herein, the usage logs (362) are employed as data for the collection mechanism learning. In an exemplary embodiment, the learning aspect at step (364) validates a value of the collection mechanisms as a resource. For example, in an embodiment, the learning aspect at step (364) provides output in the form of reliability or a reliability factor of different collection mechanisms. The confidence learning at step (364) interfaces with the identification or determination of the content collection mechanisms at step (356) to dynamically apply the learning to the identification, selection, and application of the context collection mechanism. Details of collection mechanism confidence learning are shown and described in FIGS. 8A and 8B. Accordingly, as shown herein there are two primary components directed at the chatbot and the problem diagnosis, with one of the primary components directed at building a context model and another of the primary components directed at leveraging the context model with respect to dynamic, e.g., runtime, context collection assessment and refinement.

Figure 4:
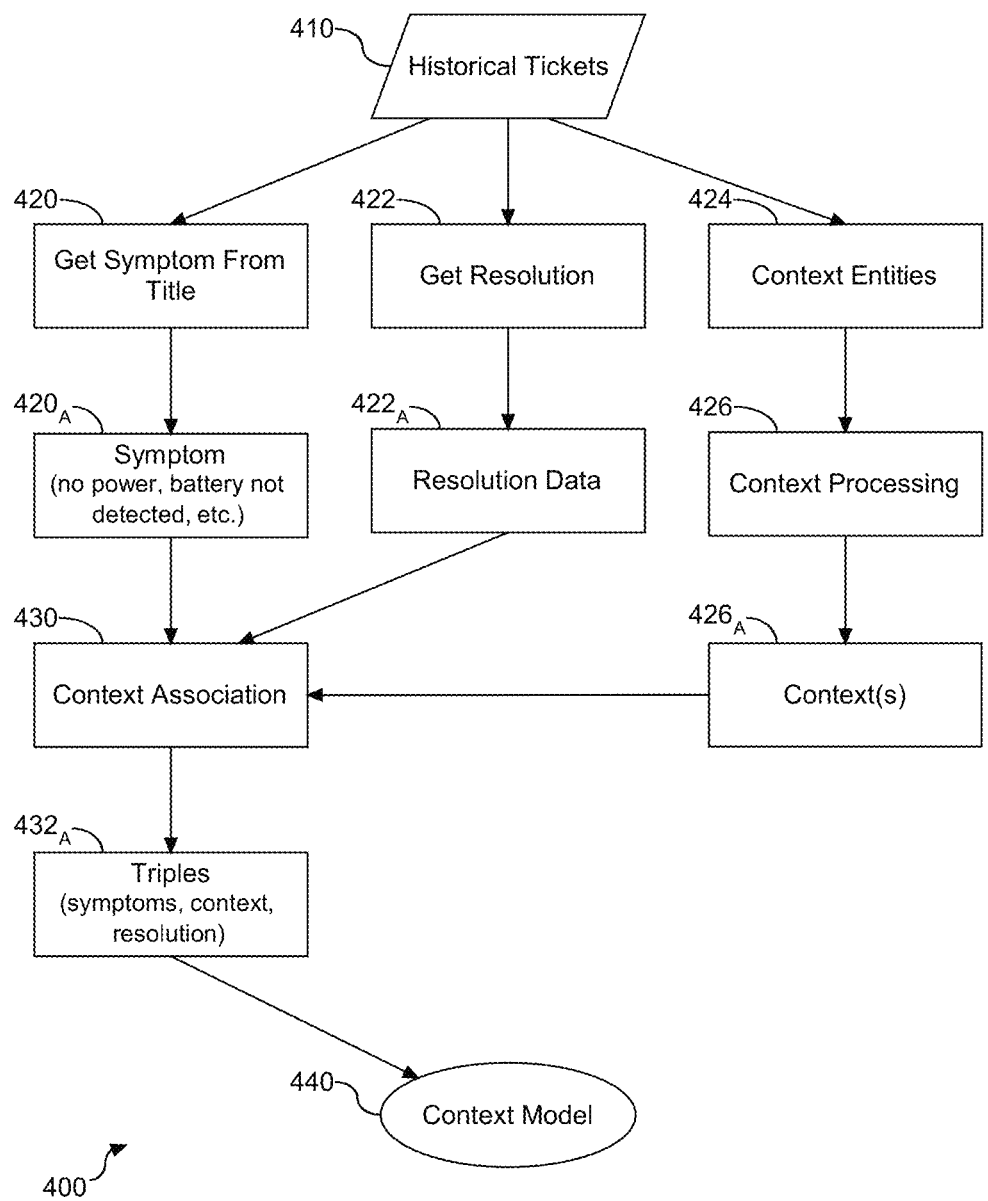
FIG. 4 depicts a flowchart illustrating an embodiment of a method of building a domain context model.

Referring to FIG. 4, a flow chart (400) illustrating a process for building a domain context model is provided. As shown herein by way of example, input (410) is in the form of historical tickets, which in an exemplary embodiment includes reported problems and corresponding resolutions, respectively. In an embodiment, the input (410), such as historical tickets, is obtained or otherwise received or documented from prior chatbot experiences. The input at step (410) is not limited to historical tickets, and in an embodiment, the input at step (410) may be in the form of forum data, system change data, or a combination thereof. Regardless of the input data form, the input (410) is leveraged to obtain embedded symptom data, including symptom description(s) (420), resolution data (422), and context (424). In an embodiment, the symptom description(s) (420) is obtained from the title within a corresponding historical ticket input. Similarly, in an embodiment, natural language processing (NLP) identifies symptom description(s) ($420_A$) from the input (410). Examples of symptom description(s) ($420_A$) may be, but are not limited to, "no power" and "battery not detected". The resolution data ($422_A$) is directed at how a symptom in a historical input ticket was resolved, e.g. concluded. Similar to the symptom description(s) (420), NLP may be leveraged to identify the corresponding resolution data (422). Examples of resolution data ($422_A$) corresponding to the symptom description(s) examples may be, but are not limited to, "replace battery" and "tighten battery latch", respectively. The context obtained or identified at step (424) is extracted from the input (410). In an exemplary embodiment, the context (424) is obtained or extracted from the title and/or problem description within one or more historical tickets. Examples of context include but are not limited to, operating system, brand, version, etc. The context (424) is subject to further processing, as shown in step (426). As shown herein by way of example, n-gram extraction, i.e., a contiguous sequence of n items and parts of speech analysis is applied to the context (426). Examples of context ($426_A$) obtained from the n-gram extraction may be, but are not limited to, "pin is bent", "red light", "green light", "no light", etc. Accordingly, processing of the historical tickets produces corresponding symptom(s), resolution, and context.

An association (430) is created among the symptom description(s) shown as step (420), the resolution shown as step (422), and the context shown at step (426). In an embodiment, the association (430) is also referred to a stitching the components of symptom, resolution, and context. For example, the association (430) may create one or more tuple(s) of {symptom, context, resolution} ($432_A$). A context model (440) is built around the context association(s) (430), such as, but not limited to, product family, product version, product brand, operating system, firmware version, error code, and light state. In an embodiment, the context model is similar to a knowledge graph. At the meta-level, the context model is the definition of entities (context), name, description, type, relationship between different entities, and at an instance level it contains actual values of the entities.

Figure 5:
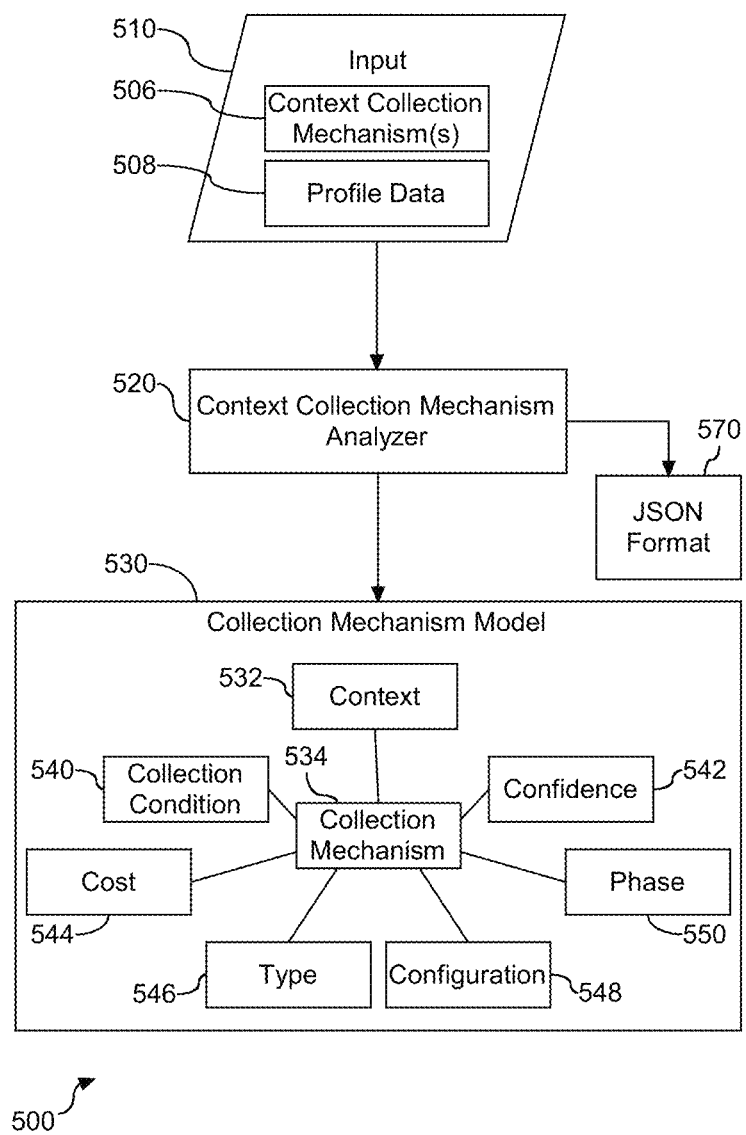
FIG. 5 depicts a flowchart illustrating an embodiment of a method of analyzing context collection mechanism(s).

As shown and described in FIG. 3, there are two aspects of the build component (310), including the building the context model, as shown and described in FIG. 4, and analyzing context collection mechanisms. Referring to FIG. 5, a flow diagram (500) is provided illustrating a process for analyzing context collection mechanism(s). As shown, input (510) is provided in the form of different mechanisms of collecting context (506) and profile data (508). Examples of context collection mechanisms include, but are not limited to, business delivery processes, such as workflow, flow diagram, and/or written steps. Similarly, examples of the profile data (508) include, but are not limited to, APIs, system, user data, and historical communication(s). The input (510) is received by or subject to a context collection mechanism analyzer (520). As shown herein, different elements of information are represented in a collection mechanism model (530), which is operatively coupled to the analyzer (520). In the example model (530) shown herein, context (532) is received by a collection mechanism (534). Using the context (532), the collection mechanism (534) identifies a collection condition (540), confidence (542), cost (544), type (546), configuration (548), and phase (550). In an exemplary embodiment, the collection condition (540) may be in the form of input parameters for an API, the confidence (542) may be a value representing a likelihood of fetching content from a given context source, the cost (544) may be a value associated with using a content source, including response time and accuracy, the type (546) represents a content source type, the configuration (548) represents the context source specification, and the phase (550) represents a state during which the content can be collected. As shown herein, and in an exemplary embodiment, the collection mechanism model (530) is represented in JavaScript Object Notation (JSON) (570). In an exemplary embodiment, the confidence value of the collection mechanism(s) at build time may be subject to an update or refinement, as shown in step (390) of FIG. 3. Accordingly, collection mechanisms are subject to analysis to support the dynamic assessment of content.

Figure 6A:
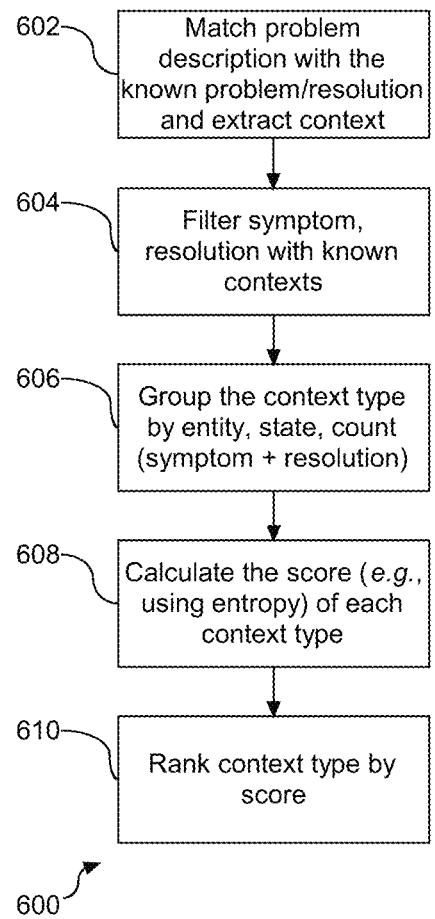
FIG. 6A depicts a flowchart illustrating an embodiment of a method of dynamically determining content to be collected and a corresponding collection sequence.
Figure 6B:
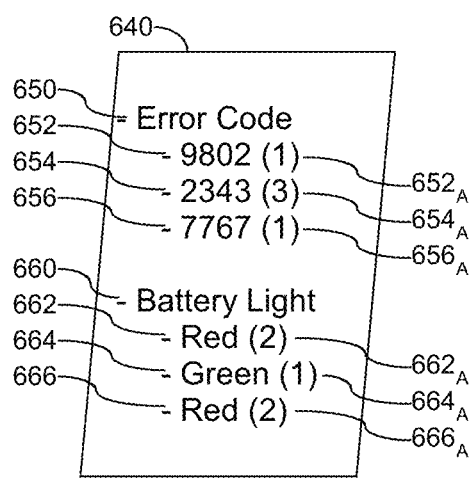
FIG. 6B depicts a block diagram illustrating sample groupings of context.

Referring to FIG. 6A, a flow chart (600) is provided to illustrate a process for dynamically determining content to be collected and a corresponding collection sequence. Order is defined as an arrangement or disposition of people or things in relation to each other according to a particular sequence, pattern, or method. The sequence determination process is directed at an order in which various contexts should be collected from various collection mechanisms. A user articulated problem, also referred to herein as a user problem or description, is identified via the chatbot interface, and a corresponding problem description is subject to matching with a known problem resolution (602). In an embodiment, the problem description presented at step (602)

includes a subject and a corresponding problem. The data extracted from step (602) is subject to filtering with known contexts (604). It is understood in the art that context has a corresponding entity and entity state, hereinafter referred to as a state. For example, a battery case or opening may have a latch and a state of the latch. Similarly, a pin may be employed to detect a battery and the state of the pin may be bent. Following step (604), the context type is grouped by the entity, state, and count (606), with the count being the symptom combined with a resolution. Referring to FIG. 6B, a block diagram (640) is provided to illustrate sample groupings of context. As shown in this example, an entity may be an error code (650), with corresponding states (652), (654), and (656), and each state having a count (652$_A$), (654$_A$), and (656$_A$), respectively. In another example, an entity may be battery light (660), with corresponding states being a light color, shown as (662), (664), and (666), and each state having a count (662$_A$), (664$_A$), and (666$_A$), respectively.

Following step (606), a score of each context type is calculated (608), with the score representing an indicator for data collection prioritization. In an exemplary embodiment, the score is assessed of each context type using entropy. Using the example of the error code entity (650), the entropy score is assessed as follows:

$$E(\text{error code}) = -1^* \left( \frac{1}{5}\ln\left(\frac{1}{5}\right) + \frac{3}{5}\ln\left(\frac{3}{5}\right) + \frac{1}{5}\ln\left(\frac{1}{5}\right) \right) = 0.46$$

Similarly, using the example of the error code entity (660), the entropy score is assessed as follows:

$$E(\text{light state}) = -1^* \left( \frac{2}{5}\ln\left(\frac{2}{5}\right) + \frac{1}{5}\ln\left(\frac{1}{5}\right) + \frac{2}{5}\ln\left(\frac{2}{5}\right) \right) = 0.41$$

After the score assessment at step (608), the context type is subject to an order or ranking (610), and in an embodiment, the context types are organized in an order based on the entropy score. In an embodiment, the context type with higher score, e.g. higher entropy score, is selected at step (610). By selecting the context type in order of the entropy scores from highest to lowest, the process selects the context that would gather the maximum information, and thereby reduce the need to ask questions pertaining to other types of contexts, which in an embodiment may be associated with a lower entropy score. In an exemplary embodiment, the order organization starts with selection of the context with the highest entropy score and is followed by context selection in descending order. In an embodiment, the order may have a different organization, and as such, the descending order organization should not be considered limiting. Using the example shown herein, the light state context would be collected secondarily after the error code context. Accordingly, as shown herein as assessment is utilized to determine the order in which various context inputs should be collected from the various collection mechanisms.

Figure 7:
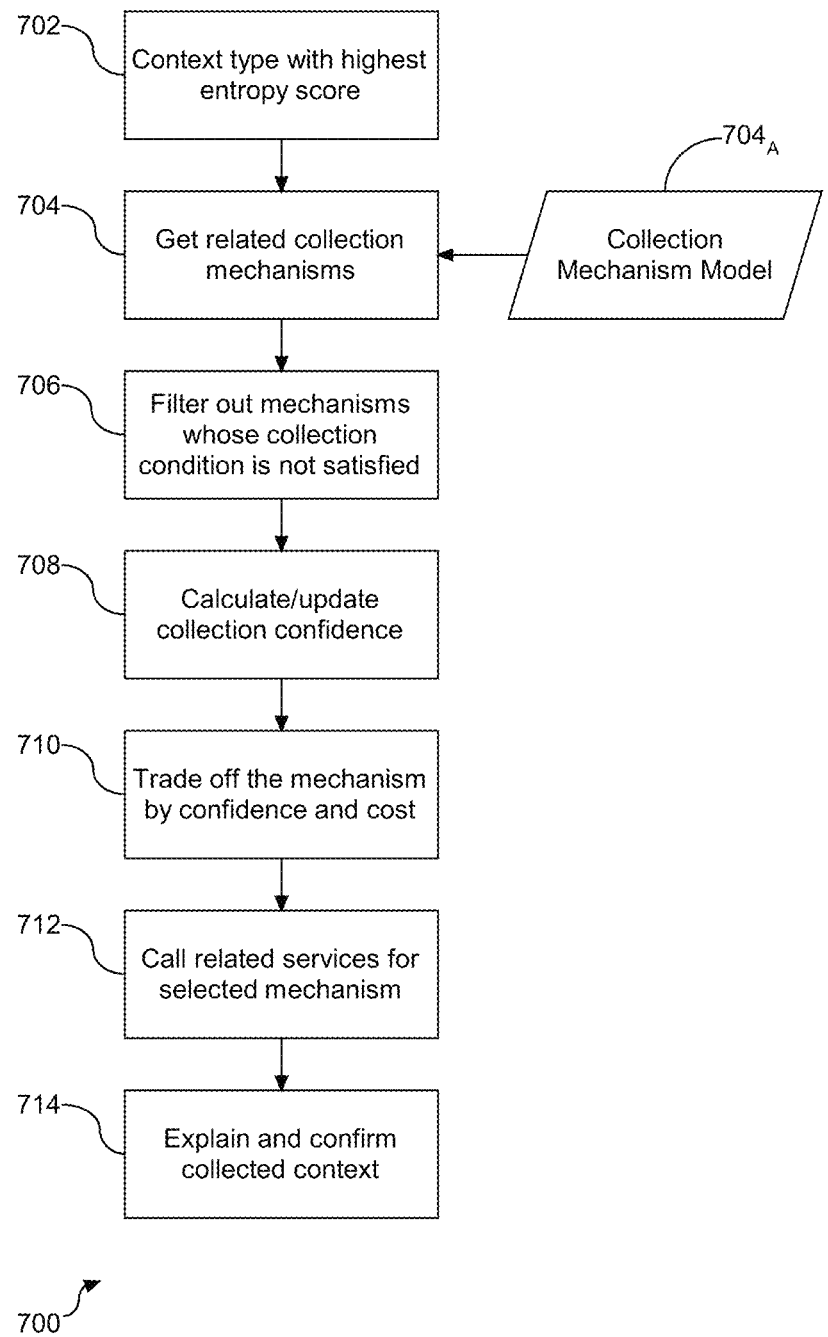
FIG. 7 depicts a flow chart illustrating an embodiment of a method of dynamically determining the context collection mechanism.

As shown and described herein, two or more context collection mechanisms may be available and/or utilized to collect the same or similar content. More specifically, the collection mechanisms represent different tools for collecting the same data. It is understood that one collection mechanism may be assessed to return more accurate or pertinent context than a second collection mechanism. Referring to FIG. 7, a flow chart (700) is provided to illustrate a process for dynamically determining the context collection mechanism. As shown, this process leverages the context type with the highest entropy score (702), as shown and described in FIGS. 6A and 6B. By way of example, the highest entropy score of 0.46 is for the error code entity. The collection mechanism model (704$_A$), as described in FIG. 5, is leveraged together with the context type identified at step (702) to obtain related collection mechanisms (704). In an embodiment, the collection mechanism model is a knowledge base of collection mechanisms. In an exemplary embodiment, the collection mechanism model is in JSON format. The model is subject to filtering or a filtering process to remove one or more collection conditions that are not satisfied (706), followed by calculating or updating one or more remaining collection mechanisms and their corresponding collection confidence values (708). In an embodiment, each collection mechanism in the model has a corresponding confidence value. In an exemplary embodiment, the confidence values are initially learned from historical data, learned based on system usage, or in an embodiment manually configured by a subject matter expert (SME). Details of collect mechanism confidence learning is shown and described in FIGS. 8A and 8B. Following the confidence value update at step (708), at least one collection mechanism is selected based on the corresponding confidence value (710). In an embodiment, the selection at step (710) also considers cost associated with the collection mechanism(s) prior to selection, with the cost directed at an expense of accessing a data collection and processing associated data. In an exemplary embodiment, the selection of the collection mechanism includes optimizing a mechanism with a maximum confidence value and a low or lower cost. Using the selected mechanism from step (710), related services are called to collect context (712) and to confirm the collected context (714). Details of confirming the collected context is shown and described in FIG. 9. Accordingly, as shown herein, the aspect of determining an appropriate collection mechanism is a dynamic process that leverages both confidence and corresponding cost(s).

Figure 8A:
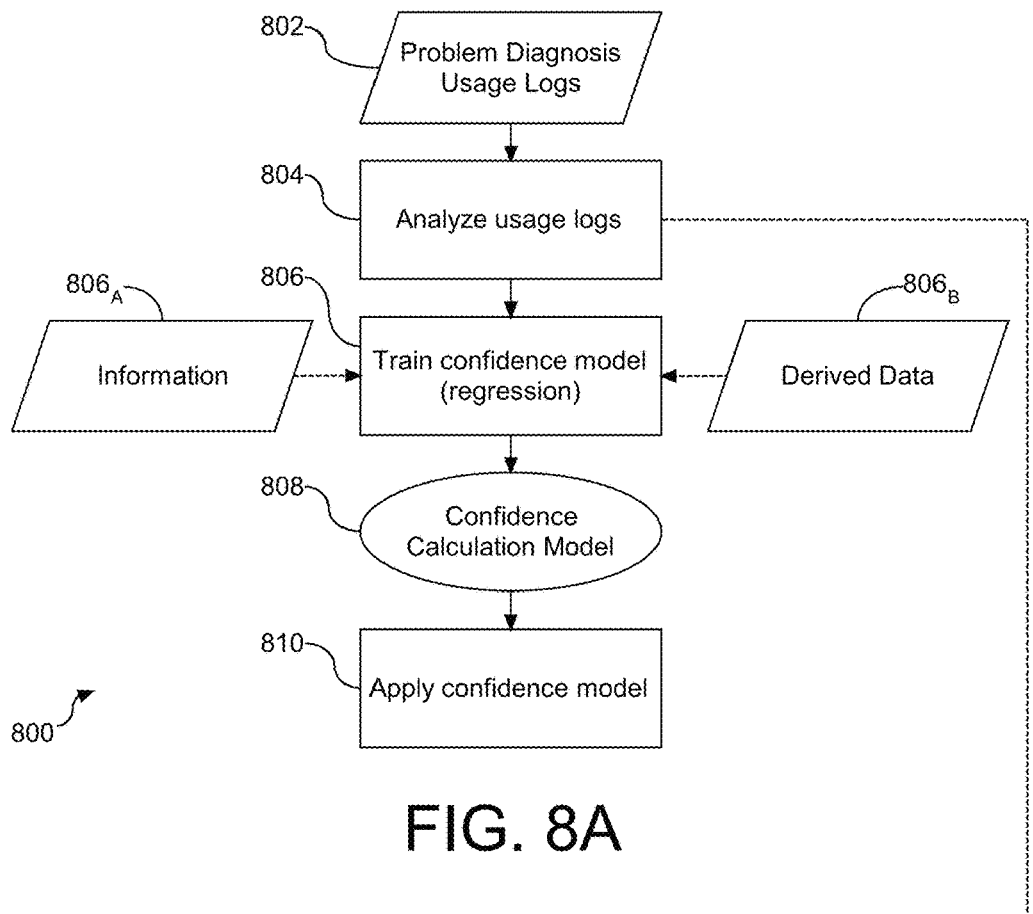
FIG. 8A depicts a flow chart illustrating an embodiment of a method of collection mechanism confidence learning.
Figure 8B:
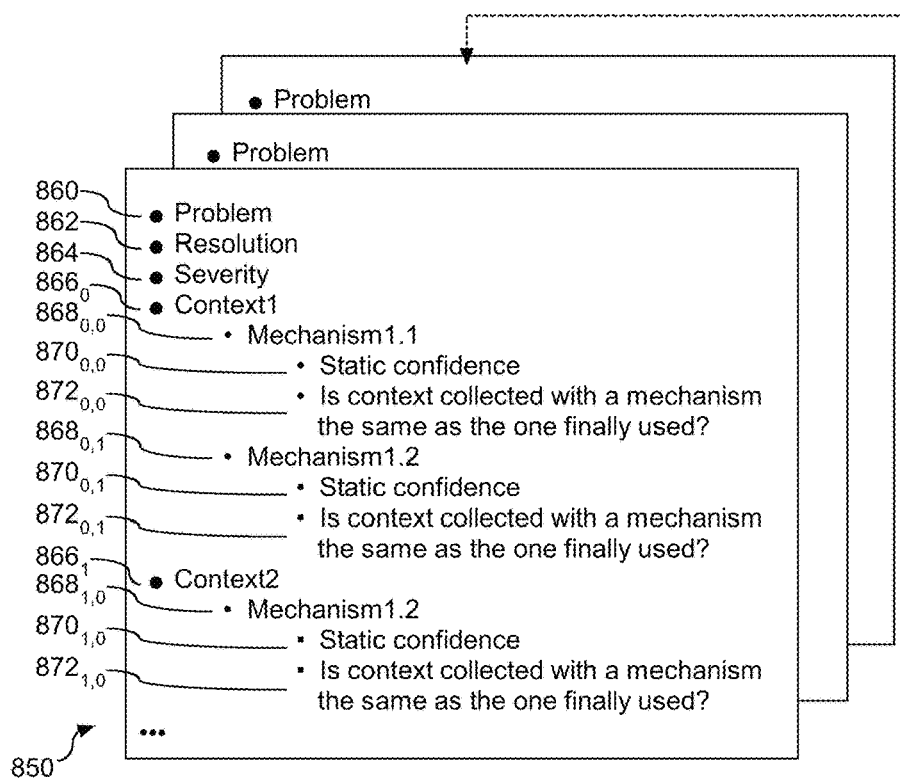
FIG. 8B depicts a block diagram illustrating an example usage log employed in the confidence learning.

As shown and described in FIG. 7, the determination and selection of the context collection mechanism includes a learning component. Referring to FIG. 8A, a flow chart (800) is provided to illustrate a process for collection mechanism confidence learning that in an embodiment is utilized to prioritize data collection. It is understood in the art that data logging is a process of collecting and storing data over a period of time in order to analyze specific trends or record data-based events or actions. Data logging enables the tracking of all interactions through which data, files, or applications are stored, accessed, or modified on a storage device or application. A usage log is the computer file(s) that contains the data logging. As shown herein, usage logs with problem diagnosis are received as input (802) and subject to analysis (804). Referring to FIG. 8B, an example usage log (850) is shown. In this example, the log (850) shows a problem (860), resolution (862), severity (864), and context$_0$ (866$_0$) and context$_1$ (866$_1$). Context$_0$ (866$_0$) is shown with collection mechanism$_{0,0}$ (868$_{0,0}$) and collection mechanism$_{0,1}$ (868$_{0,1}$), and contexts (866$_1$) is shown with collection mechanism$_{1,0}$ (868$_{1,0}$). Each of the collection mechanisms shown in the usage logs has a corresponding confidence value, which in an embodiment may be a static value created or assigned at build time, and a field entry to indicate if the context collected with the corresponding mechanisms is the same as that used to resolve the presented problem. By way of example, collection mechanism$_{0,0}$ (868$_{0,0}$) is shown with confidence$_{0,0}$ (870$_{0,0}$) and field entry$_{0,0}$ ($872_{0,0}$), collection mechanism$_{0,1}$ ($868_{0,1}$) is shown with confidence$_{0,1}$ ($870_{0,1}$) and field entry$_{0,1}$ ($872_{0,1}$), and collection mechanism$_{1,0}$ ($868_{1,0}$), is shown with confidence$_{1,0}$ ($870_{1,0}$) and field entry$_{1,0}$ ($874_0$).

Using the analyzed usage logs, a confidence model is subject to training (806). In an exemplary embodiment, the model is provided with information (806$_A$), such as predefined feature weight(s), and derived data (806$_B$), such as independent variables and dependent variables. In an embodiment, examples of independent variables include, but are not limited to, problem, resolution, severity, context, mechanism used, and static confidence of the used collection mechanism, and an example of a dependent variable includes, but is not limited to, confidence value. In an exemplary embodiment, the confidence model training at step (806) is the ANN shown and described in FIG. 1, also referred to herein as a regression model, to determine a relationship between an independent variable and a dependent variable. The training of the confidence model at step (806) computes a confidence value of one or more context collection mechanisms (808). In an exemplary embodiment, the context collection mechanisms are subject to an ordering, sorting, or prioritization (810) based on their corresponding confidence values as assessed by the model. Accordingly, as shown herein, the collection mechanisms leverage data logs to identify corresponding confidence values.

Figure 9:
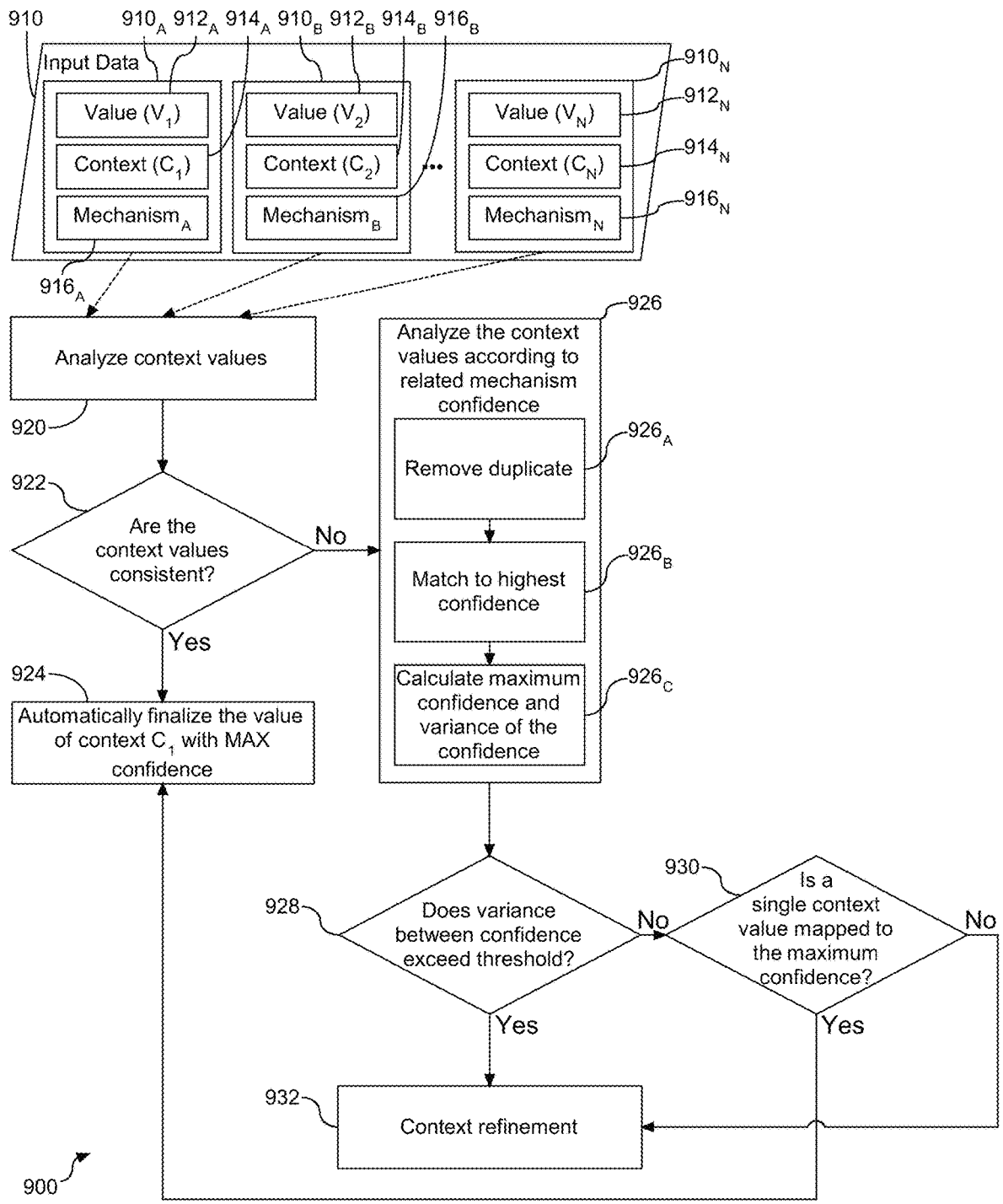
FIG. 9 depicts a flow chart illustrating an embodiment of a method of confirming the collected content, which in an exemplary embodiment includes cross-validation of the collected context.

As shown and described in FIG. 3, the determined context collection mechanism(s) are utilized to collect context (358), which may be subject to refinement. Referring to FIG. 9, a flow chart (900) is provided to illustrate a process for confirming the collected content, which in an exemplary embodiment includes cross-validation of the collected context. As shown, input data is in the form of context (910). In the example shown herein, the collected context is shown at (910$_A$), (910$_B$), . . . , (910$_N$). The quantity of collected context shown herein is for illustrative purposes and should not be considered limiting. By way of example, each context is shown with a value and a corresponding collection mechanism. For example, the collected context at (910$_A$) is shown with value $V_1$ (912$_A$) of context $C_1$ (914$_A$) collected with mechanism A (916$_A$), collected context at (910$_B$) is shown with value $V_2$ (912$_B$) of context $C_2$ (914$_B$) collected with mechanism B (916$_B$), . . . , and collected context at (910$_N$) is shown with value $V_N$ (912$_N$) of context $C_N$ (914$_N$) collected with mechanism$_N$ (916$_N$). In an exemplary embodiment, the different collection mechanisms should be directed at collecting the same or consistent data. Using the input data from (910$_A$), (910$_B$), . . . , (910$_N$), the values of context are analyzed for consistency (920). In an exemplary embodiment, the analysis at step (920) is followed by an evaluation of the consistency of $V_1$ (912$_A$), $V_2$ (912$_B$), . . . , $V_N$ (912$_N$) (922). If at step (922) it is determined that the values of the analyzed context are consistent, then the value $V_1$ (912$_A$) of context $C_1$ (914$_A$) is automatically finalized or designated as having a maximum confidence (924). Conversely, if at step (922) it is determined that the values of the analyzed context are not consistent then the context values are subject to further analysis according to a related mechanism confidence (926). In an exemplary embodiment, the analysis of the context values at step (926) includes removing duplicate values (926$_A$), matching each of the non-duplicate values to a highest confidence (926$_B$), and calculating a maximum confidence and a variance of the confidence (926$_C$).

Following the evaluation of the context values at step (926), it is determined if the variance between confidence exceeds a threshold or threshold value (928). In an exemplary embodiment, threshold or threshold value is configurable. A negative response to the determination at step (928) is followed by determining if a single context value is mapped to the maximum confidence (930). A positive response to the determination at step (930) is followed by automatically finalizing the value of the single context leveraged and identified at step (930) as having a maximum confidence (924). Conversely, following either a positive response to the determination at step (928) or a negative response to the determination at step (930), it is determined that there are multiple context values having a high maximum confidence. Either of these scenarios is followed by context refinement (932). In an exemplary embodiment, the context refinement (932) leverages a Human-in-the-Loop to intervene and communicate with a user via the chatbot interface. Accordingly, as shown and described herein, the confirmation process cross-validates the different forms of the collected context by analyzing consistent of the context value returned from the different collection mechanisms.

Figure 10:
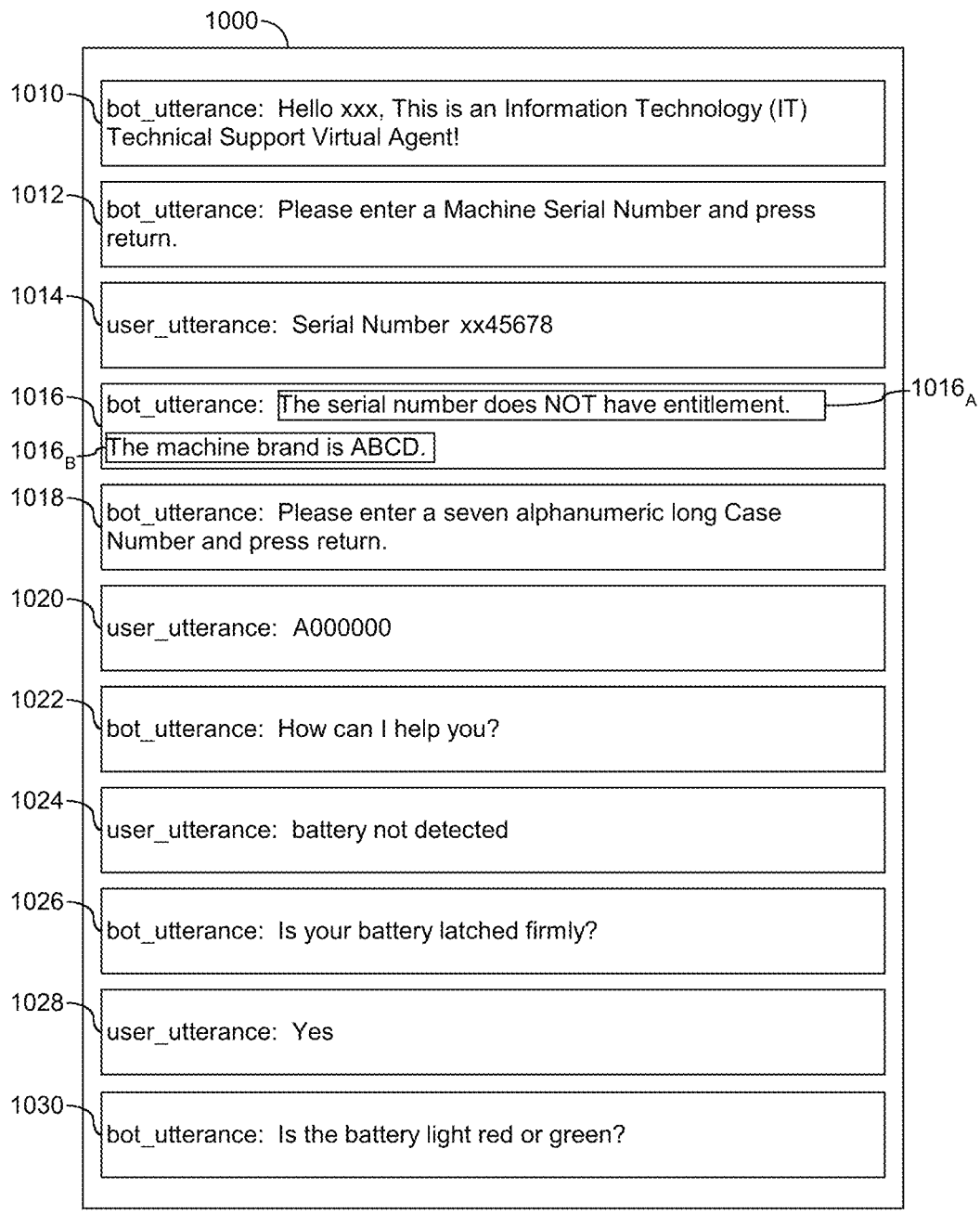
FIG. 10 depicts a block diagram illustrating an example of a dynamic chatbot interaction demonstrating problem refinement.

Referring to FIG. 10, a block diagram (1000) is provided to illustrate an example dynamic chatbot interaction demonstrating problem refinement. An initial introductory text is shown at (1010). In this example, the introductory dialog identifies Information Technology (IT) Technical Support and supported aspects. The introductory text (1010) is followed by a request for the recipient to enter or otherwise provide a machine serial number (1012). Using the provided serial number (1014), the chatbot leverages the domain context model and identifies product information (1016), including a corresponding machine brand (1016B) and a warranty indication (1016A). In an embodiment, an API is leveraged to identify the machine brand. To further identify the context of the problem, the dialog is shown with chatbot text requesting entry of a case number for the apparatus (1018), followed by an entry from the recipient (1020) and chatbot text to solicit a problem description (1022). The problem description is shown at (1024) indicating "battery not detected". The remainder of the dialog leverages the runtime component shown at (350) to determine the collection sequence and corresponding collection mechanisms. Using identified context type, the chatbot presents a question for the user to identify if the battery is latched firmly (1026). In an embodiment, the presented question is identified from the collection sequence determination, as shown and described in FIGS. 6A and 6B. In this example, it is shown that the battery latching is not the basis for the error (1028), and a subsequent question is presented to the user via the chatbot platform (1030). In an embodiment, the subsequent question at (1030) is from the next question in the collection sequence. Accordingly, this example dialog demonstrates dynamic refinement of a problem via utilization of one or more collection mechanisms.

Figure 11:
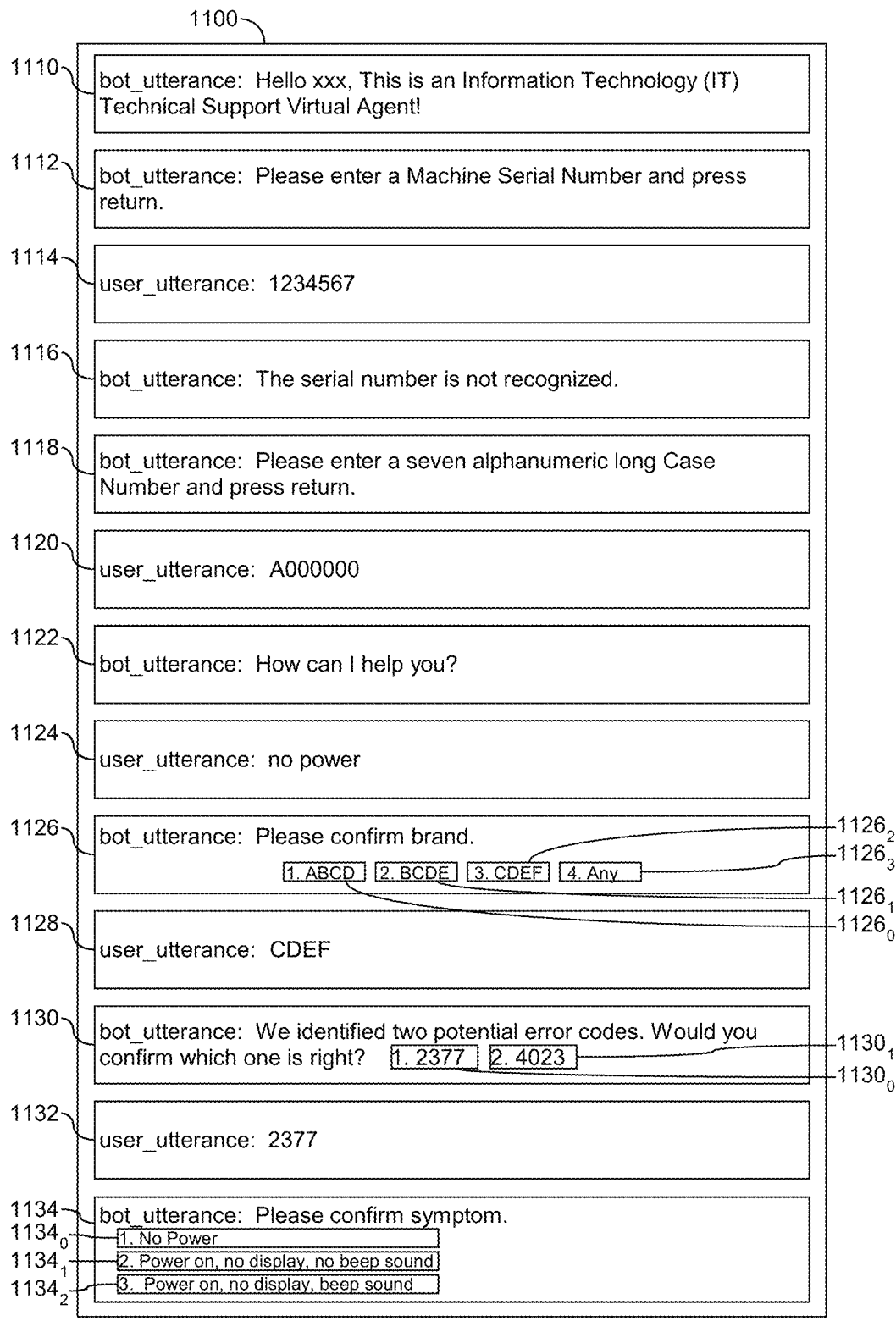
FIG. 11 depicts a block diagram illustrating another example of a dynamic chatbot interaction demonstrating problem refinement.

Referring to FIG. 11, a block diagram (1100) is provided to illustrate another example of a dynamic chatbot interaction demonstrating problem refinement. An initial introductory text is shown at (1110). In this example, the introductory dialog identifies Technical Support and supported aspects. The introductory text (1110) is followed by a request for the recipient to enter or otherwise provide a machine serial number (1112). Using the provided serial number (1114), the chatbot leverages the domain context model and identifies or indicates that the serial number is not recognized (1116). In an embodiment, an API is leveraged to identify the machine serial number. To further identify the context of the problem, the dialog is shown with chatbot text requesting entry of a case number for the apparatus (1118), followed by an entry from the recipient (1120), and chatbot text to solicit a problem description (1122). The problem description is shown at (1124) indicating "no power". The remainder of the dialog leverages the runtime component shown at (350) to determine the collection sequence and collection mechanisms. Using identified context type, the chatbot presents a question for the user to identify the apparatus brand (1126). In an embodiment, the presented question is identified from the collection sequence determination, as shown and described in FIGS. 6A and 6B. In this example, the question presented at step (1126) is multiple choice shown four options at (1126$_0$), (1126$_1$), (1126$_2$), and (1126$_3$). In an embodiment, the question presented may include a different quantity of options, or in an embodiment, present only one option. The user selection is shown as a verbal utterance (1128), e.g. option (1126$_2$) in this example with a selection of the apparatus brand. Using the brand selection, the next collection mechanism(s) in the sequence is identified. In this example, the next collection mechanism is shown at (1130), and is shown herein as potential error codes. Similar to step (1126), the next collection mechanism (1130) is presented as multiple choice (1130$_0$) and (1130$_1$). The selection in this example is shown at (1132) as (1130$_0$), and is followed with a request to confirm a symptom (1134) which in this example is directed to a third selection option of an appropriate symptom from a set of symptoms (1134$_0$), (1134$_1$), and (1134$_2$) from which the user can select.

As shown and described in FIGS. 1-11, a context model is leveraged to dynamically ascertain a context collection sequence and one or more corresponding collection mechanisms to collect context and to further narrow the scope of known problems as related to a presented problem, and more specifically to identify what needs to be collected to enhance problem resolution. The learning aspect as supported by the collection manager (152) and the director (154), and as shown and described in FIGS. 8A and 8B, dynamically optimizes the collection mechanism selection and application to minimize the presentation of questions to attain a resolution of the presented or identified problems, i.e., minimization of the chatbot dialog.

Figure 12:
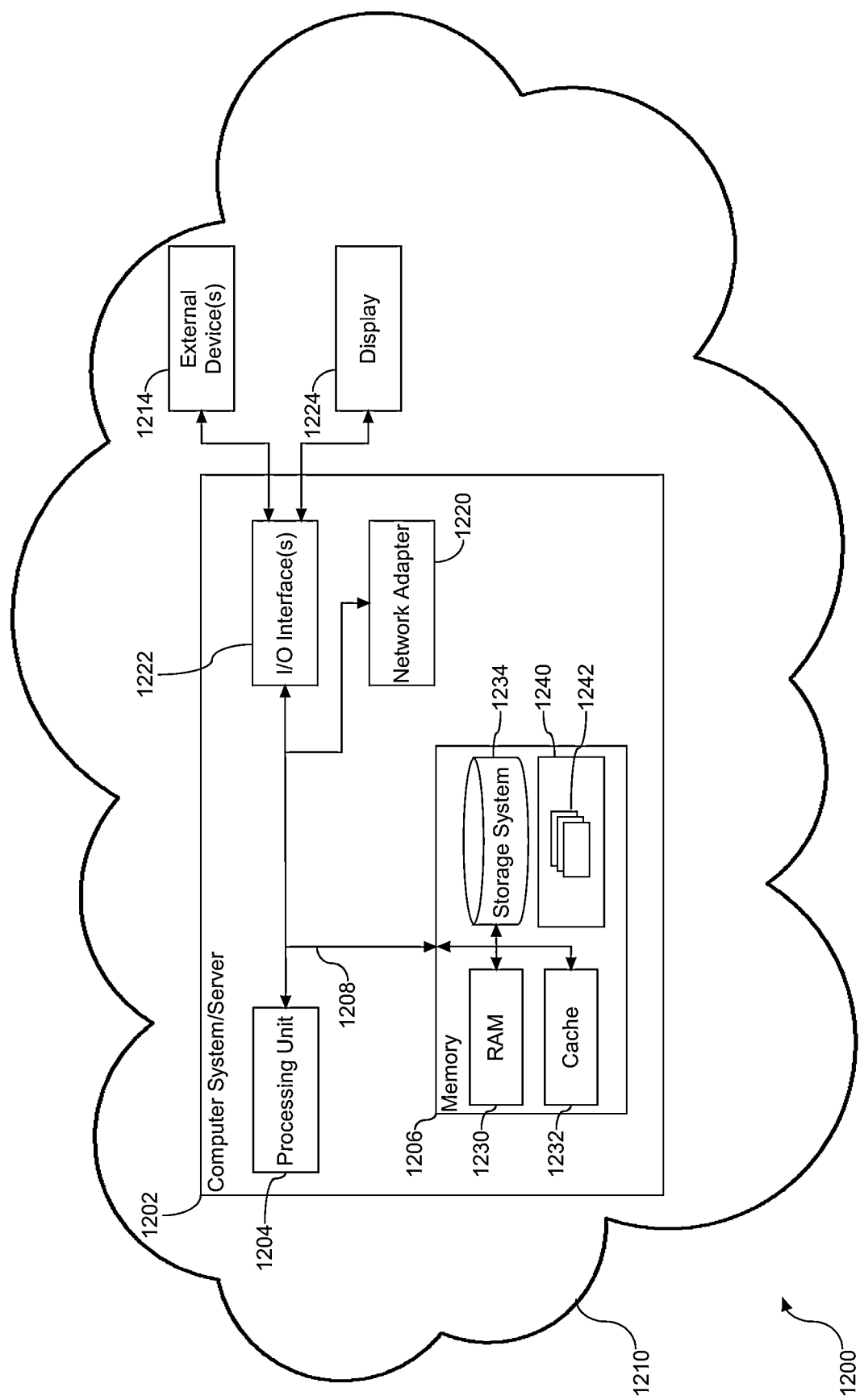
FIG. 12 depicts a block diagram illustrating an example of a computer system/server of a cloud based support system, to implement the system and processes described above with respect to FIGS. 1-11.

Embodiments shown and described herein may be in the form of a computer system for use with an intelligent computer platform for enriching the performance of a dialog system and a corresponding automated virtual agent. Aspects of the tools (152), (154), (156), and (158) and their associated functionality may be embodied in a computer system/server in a single location, or in an embodiment, may be configured in a cloud based system sharing computing resources. With reference to FIG. 12, a block diagram (1200) is provided illustrating an example of a computer system/server (1202), hereinafter referred to as a host (1202) in communication with a cloud based support system (1210), to implement the system, tools, and processes described above in FIGS. 1-11. In an embodiment, host (1202) is a node of a cloud computing environment. The host (1202) is operational with numerous other general purpose or special purpose computing system environments or configurations. Examples of well-known computing systems, environments, and/or configurations that may be suitable for use with host (1202) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The host (1202) may be described in the general context of computer system-executable instructions, such as program modules, being executed by a computer system. Generally, program modules may include routines, programs, objects, components, logic, data structures, and so on that perform particular tasks or implement particular abstract data types. The host (1202) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the host (1202) is shown in the form of a general-purpose computing device. The components of host (1202) may include, but are not limited to, one or more processors or processing units (1204), e.g. hardware processors, a system memory (1206), and a bus (1208) that couples various system components including system memory (1206) to processor (1204). The bus (1208) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The host (1202) typically includes a variety of computer system readable media. Such media may be any available media that is accessible by the host (1202) and it includes both volatile and non-volatile media, removable and non-removable media.

The system memory (1206) can include computer system readable media in the form of volatile memory, such as random access memory (RAM) (1230) and/or cache memory (1232). By way of example only, storage system (1234) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus (1208) by one or more data media interfaces.

Program/utility (1240), having a set (at least one) of program modules (1242), may be stored in the system memory (1206) by way of example, and not limitation, as well as an operating system, one or more application programs, other program modules, and program data. Each of the operating systems, one or more application programs, other program modules, and program data or some combination thereof, may include an implementation of a networking environment. Program modules (1242) generally carry out the functions and/or methodologies of embodiments to dynamically interpret and understanding request and action descriptions, and effectively augment corresponding domain knowledge. For example, the set of program modules (1242) may include the tools (152), (154), (156), and (158) as shown in FIG. 1.

The host (1202) may also communicate with one or more external devices (1214), such as a keyboard, a pointing device, etc.; a display (1224); one or more devices that enable a user to interact with the host (1202); and/or any devices (e.g., network card, modem, etc.) that enable the host (1202) to communicate with one or more other computing devices. Such communication can occur via Input/Output (I/O) interface(s) (1222). Still yet, the host (1202) can communicate with one or more networks such as a local area network (LAN), a general wide area network (WAN), and/or a public network (e.g., the Internet) via network adapter (1220). As depicted, the network adapter (1220) communicates with the other components of the host (1202) via the bus (1208). In an embodiment, a plurality of nodes of a distributed file system (not shown) is in communication with the host (1202) via the I/O interface (1222) or via the network adapter (1220). It should be understood that although not shown, other hardware and/or software components could be used in conjunction with the host (1202). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (1206), including RAM (1230), cache (1232), and storage system (1234), such as a removable storage drive and a hard disk installed in a hard disk drive.

Computer programs (also called computer control logic) are stored in memory (1206). Computer programs may also be received via a communication interface, such as network adapter (1220). Such computer programs, when run, enable the computer system to perform the features of the present embodiments as discussed herein. In particular, the computer programs, when run, enable the processing unit (1204) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

The functional tools described in this specification have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Figure 13:
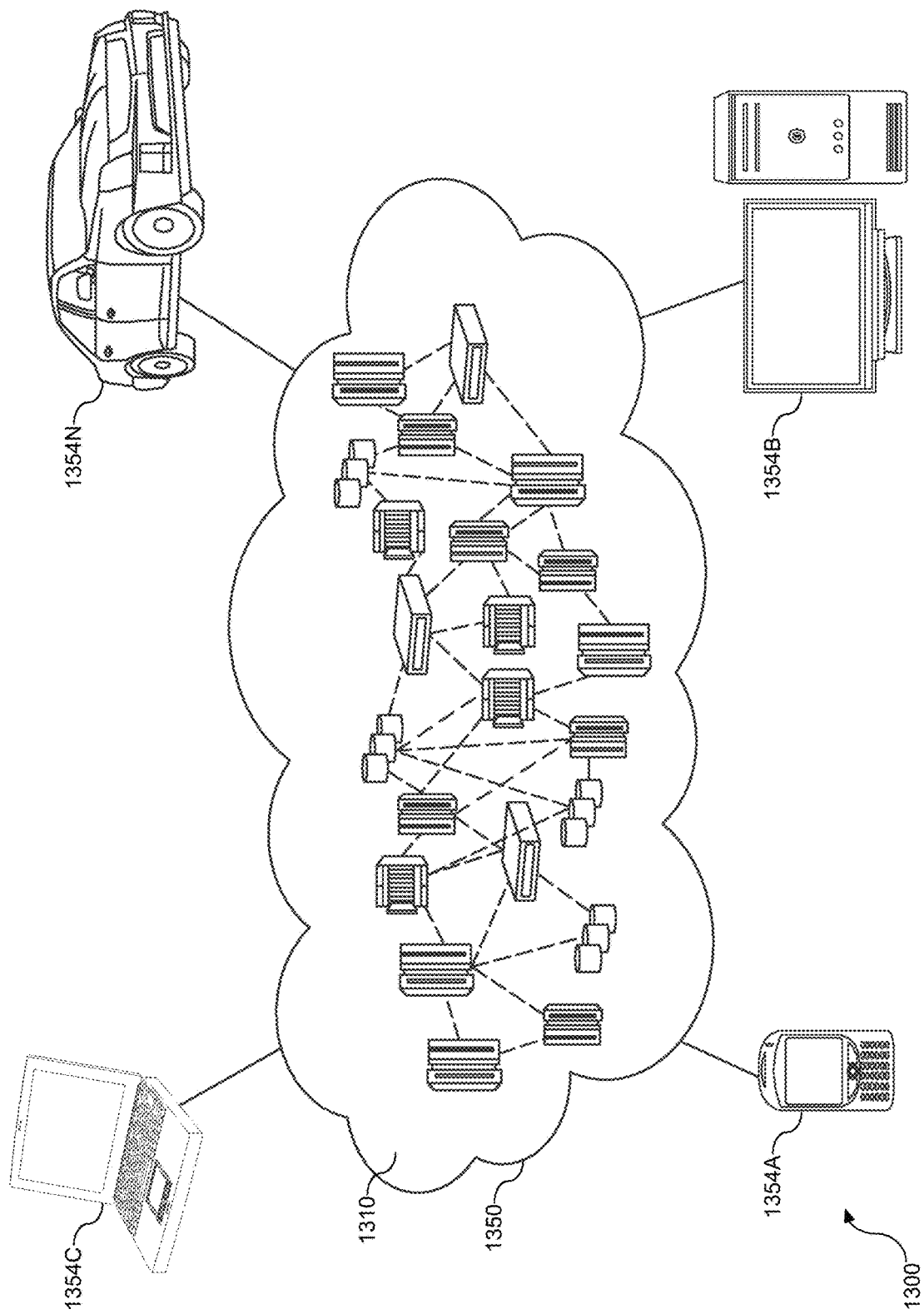
FIG. 13 depicts a block diagram illustrating a cloud computer environment.

Referring now to FIG. 13, an illustrative cloud computing network (1300). As shown, cloud computing network (1300) includes a cloud computing environment (1350) having one or more cloud computing nodes (1310) with which local computing devices used by cloud consumers may communicate. Examples of these local computing devices include, but are not limited to, personal digital assistant (PDA) or cellular telephone (1354A), desktop computer (1354B), laptop computer (1354C), and/or automobile computer system (1354N). Individual nodes within nodes (1310) may further communicate with one another. They may be grouped (not shown) physically or virtually, in one or more networks, such as Private, Community, Public, or Hybrid clouds as described hereinabove, or a combination thereof. This allows cloud computing environment (1300) to offer infrastructure, platforms and/or software as services for which a cloud consumer does not need to maintain resources on a local computing device. It is understood that the types of computing devices (1354A-N) shown in FIG. 13 are intended to be illustrative only and that the cloud computing environment (1350) can communicate with any type of computerized device over any type of network and/or network addressable connection (e.g., using a web browser).

Figure 14:
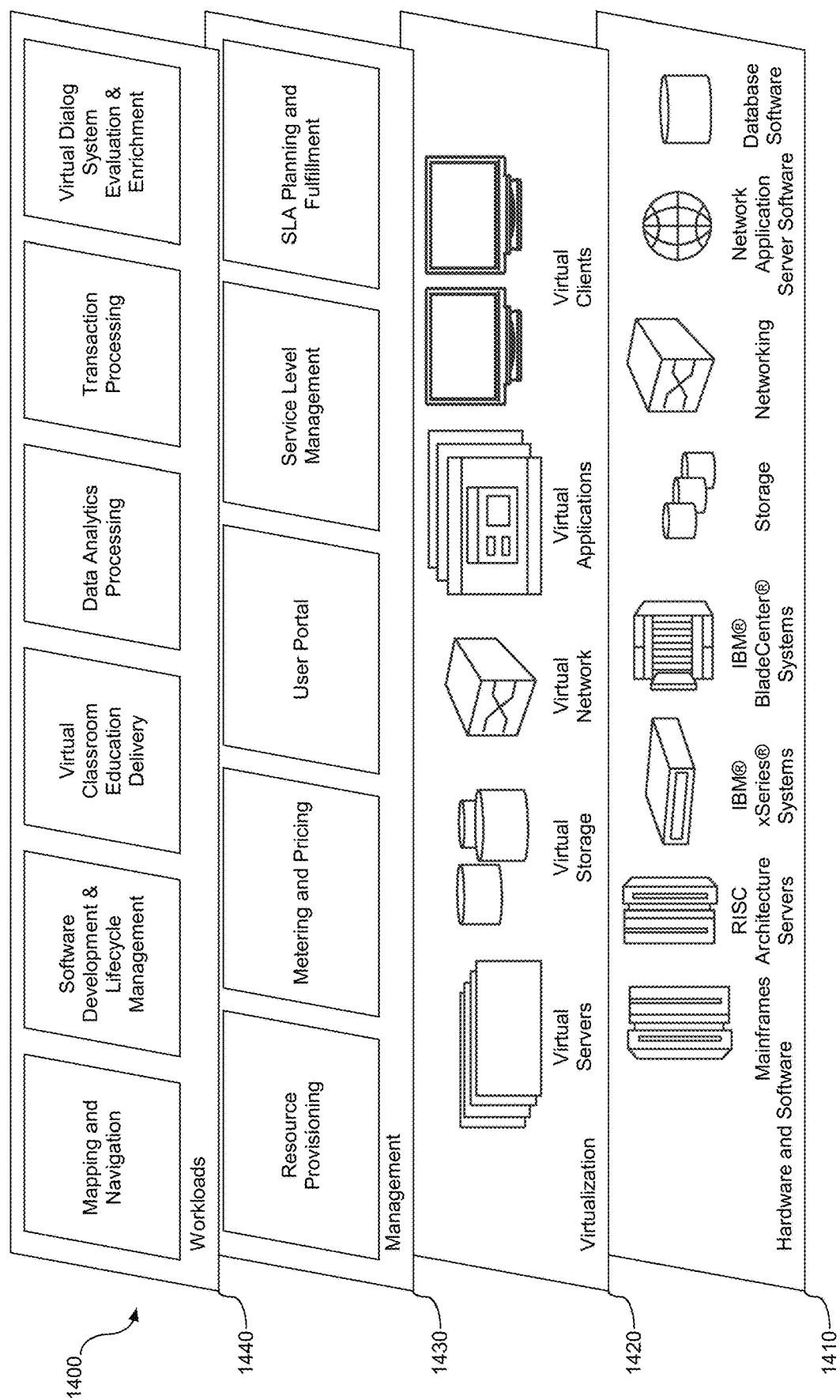
FIG. 14 depicts a block diagram illustrating a set of functional abstraction model layers provided by the cloud computing environment.

Referring now to FIG. 14, a set of functional abstraction layers (1400) provided by the cloud computing network of FIG. 13 is shown. It should be understood in advance that the components, layers, and functions shown in FIG. 14 are intended to be illustrative only, and the embodiments are not limited thereto. As depicted, the following layers and corresponding functions are provided: hardware and software layer (1410), virtualization layer (1420), management layer (1430), and workload layer (1440).

The hardware and software layer (1410) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1420) provides an abstraction layer from which the following examples of virtual entities may be provided: virtual servers; virtual storage; virtual networks, including virtual private networks; virtual applications and operating systems; and virtual clients.

In an example, management layer (1430) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1440) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and virtual dialog system evaluation and enrichment.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles. As used herein, the term "and/or" means either or both (or one or any combination or all of the terms or expressed referred to).

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to support virtual dialog system evaluation and enrichment.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
 a processor operatively coupled to memory and an artificial intelligence (AI) platform operatively coupled to the processor, the AI platform comprising one or more tools to interface with a virtual dialog agent, the tools further comprising:
  a collection manager configured to dynamically collect context data from a virtual dialog environment for problem diagnosis, including employing natural language processing (NLP) to identify one or more context entities from the virtual dialog agent;
  a director, operatively coupled to the collection manager, configured to leverage a context model to identify a set of context entities to be collected and one or more corresponding context collection mechanisms;
  a selection manager, operatively coupled to the director, configured to dynamically select one or more of the identified context collection mechanisms responsive to the leveraged context model, wherein the selecting comprises:
   leveraging a regression model to learn a confidence value for respective ones of two or more collection mechanisms;
   cross-validating a collection sequence for the two or more collection mechanisms by analyzing consistency of a first context value associated with a first collection mechanism with respect to a second context value associated with a second collection mechanism; and
   selectively adjusting an order of the collection sequence according to the cross-validating; and
  an execution manager, operatively coupled to the selection manager, configured to selectively execute one or more of the selected and identified context collection mechanisms.

2. The computer system of claim 1, further comprising the execution manager configured to dynamically configure a control signal based on the selected one or more context collection mechanism, and the director further configured to issue the control signal to an operatively coupled physical hardware device, a process controlled by software, or a combination therein, the control signal configured to selectively control a physical state of the operatively coupled device, the software, or a combination thereof.

3. The computer system of claim 1, wherein the leverage of the context model further comprises the director configured to filter a symptom from the collected context data, calculate an entropy of each context type, and select a context type responsive to the calculated entropy.

4. The computer system of claim 1, further comprising the collection manager configured to present at least one of the identified collection mechanisms to the virtual dialog environment, and the director to dynamically optimize one or more subsequent collection mechanisms to minimize the presentation of questions to attain resolution.

5. A computer program product configured to support a virtual dialog agent interface, the computer program product comprising a computer readable storage medium having program code embodied therewith, the program code executable by a processor to:
 dynamically collect context data from a virtual dialog environment for problem diagnosis, including employing natural language processing (NLP) to identify one or more context entities from the virtual dialog agent;
 leverage a context model to identify a set of context entities to be collected and one or more corresponding context collection mechanisms;
 dynamically select one or more of the identified context collection mechanisms responsive to the leveraged context model, wherein the selecting comprises:
  leveraging a regression model to learn a confidence value for respective ones of two or more collection mechanisms;
  cross-validating a collection sequence for the two or more collection mechanisms by analyzing consistency of a first context value associated with a first collection mechanism with respect to a second context value associated with a second collection mechanism; and
  selectively adjusting an order of the collection sequence according to the cross-validating; and
 selectively execute one or more of the identified and selected context collection mechanisms.

6. The computer program product of claim 5, further comprising program code configured to dynamically configure a control signal based on the selected one or more context collection mechanism, and further configured to issue the control signal to an operatively coupled physical hardware device, a process controlled by software, or a combination therein, the control signal configured to selectively control a physical state of the operatively coupled device, the software, or a combination thereof.

7. The computer program product of claim 5, further comprising program code configured to learn collection mechanism confidence, and use the learned confidence for context collection.

8. The computer program product of claim 5, further comprising program code configured to present at least one of the identified collection mechanisms to the virtual dialog environment, and to dynamically optimize one or more subsequent collection mechanisms to minimize the presentation of questions to attain resolution.

9. A computer implemented method comprising:
dynamically collecting context data from a virtual dialog environment for problem diagnosis, including employing natural language processing (NLP) to identify one or more context entities from a virtual dialog agent;
leveraging a context model to identify a set of context entities to be collected and one or more corresponding context collection mechanisms;
dynamically selecting one or more of the identified context collection mechanisms responsive to the leveraged context model, wherein the selecting comprises:
leveraging a regression model to learn a confidence value for respective ones of two or more collection mechanisms;
cross-validating a collection sequence for the two or more collection mechanisms by analyzing consistency of a first context value associated with a first collection mechanism with respect to a second context value associated with a second collection mechanism; and
selectively adjusting an order of the collection sequence according to the cross-validating; and
selectively executing one or more of the identified and selected context collection mechanisms.

10. The computer implemented method of claim 9, further comprising dynamically configuring a control signal based on the selected one or more context collection mechanism, and issuing the control signal to an operatively coupled physical hardware device, a process controlled by software, or a combination therein, the control signal configured to selectively control a physical state of the operatively coupled device, the software, or a combination thereof.

11. The computer implemented method of claim 9, wherein leveraging the context model further comprises filtering a symptom from the collected context data, calculating entropy of each context type, and selecting a context type responsive to the calculated entropy.

12. The computer implemented method of claim 9, further comprising presenting at least one of the identified collection mechanisms to the virtual dialog environment, and dynamically optimizing one or more subsequent collection mechanisms to minimize the presentation of questions to attain resolution.

* * * * *